United States Patent
Rajasingham

(10) Patent No.: US 10,173,779 B2
(45) Date of Patent: Jan. 8, 2019

(54) VEHICLE OCCUPANT SUPPORT

(71) Applicant: Arjuna Indraeswaran Rajasingham, Bethesda, MD (US)

(72) Inventor: Arjuna Indraeswaran Rajasingham, Bethesda, MD (US)

( * ) Notice: Subject to any disclaimer, the term of this patent is extended or adjusted under 35 U.S.C. 154(b) by 0 days.

(21) Appl. No.: 14/903,573

(22) PCT Filed: Jul. 8, 2014

(86) PCT No.: PCT/US2014/045727
§ 371 (c)(1),
(2) Date: Jan. 7, 2016

(87) PCT Pub. No.: WO2015/006313
PCT Pub. Date: Jan. 15, 2015

(65) Prior Publication Data
US 2016/0194084 A1    Jul. 7, 2016

Related U.S. Application Data

(63) Continuation-in-part of application No. 14/375,673, filed as application No. PCT/US2013/000024 on Jan. 31, 2013, now Pat. No. 9,868,416, application No. 14/903,573, which is a continuation-in-part of application No. 13/820,510, filed as application No. PCT/US2011/001547 on Sep. 6, 2011, now Pat. No. 9,358,908, application No. 14/903,573, which is a continuation-in-part of application No. 14/848,575, filed on Sep. 9, 2015, now Pat. No. 9,669,739, which is a continuation-in-part of application No. 13/138,183, filed as application No. PCT/US2010/000237 on Jan. 28, 2010, now Pat. No. 9,174,555, application No. 14/903,573, which is a continuation-in-part of application No. 14/210,413, filed on Mar. 13, 2014, now Pat. No. 9,428,088, which is a continuation-in-part of application No. 12/735,146, filed as application No. PCT/US2009/000342 on Jan. 21, 2009, now Pat. No. 8,763,954.

(60) Provisional application No. 61/957,635, filed on Jul. 8, 2013, provisional application No. 61/959,598, filed on Aug. 28, 2013, provisional application No.
(Continued)

(51) Int. Cl.
*B64D 11/00* (2006.01)
*B64D 11/06* (2006.01)

(52) U.S. Cl.
CPC ...... *B64D 11/0696* (2013.01); *B64D 11/0601* (2014.12); *B64D 11/0604* (2014.12); *B64D 11/0619* (2014.12); *B64D 11/0627* (2014.12); *B64D 11/0641* (2014.12); *Y02T 50/46* (2013.01)

(58) Field of Classification Search
CPC . B64D 11/06; B64D 11/0619; B64D 11/0696; B64D 11/0648; B64D 9/003; B60N 2/01575; B60N 2/005; B60N 2/01525; B60N 2/442
See application file for complete search history.

(56) References Cited

U.S. PATENT DOCUMENTS

2011/0253874 A1*  10/2011  Marechal ........... B64D 11/0696
                                                             248/503.1
2012/0235011 A1*  9/2012  Roy ................... B64D 11/0696
                                                             248/503.1
(Continued)

*Primary Examiner* — Richard G Davis

(57) ABSTRACT

Arrangements for safety and comfort in vehicles.

13 Claims, 28 Drawing Sheets

Related U.S. Application Data

61/961,092, filed on Oct. 4, 2013, provisional application No. 61/961,367, filed on Oct. 12, 2013, provisional application No. 61/632,797, filed on Jan. 31, 2012, provisional application No. 61/685,537, filed on Mar. 20, 2012, provisional application No. 61/686,316, filed on Apr. 3, 2012, provisional application No. 61/688,591, filed on May 17, 2012, provisional application No. 61/688,855, filed on May 23, 2012, provisional application No. 61/744,431, filed on Sep. 26, 2012, provisional application No. 61/797,175, filed on Dec. 1, 2012, provisional application No. 61/797,639, filed on Dec. 12, 2012, provisional application No. 61/848,724, filed on Jan. 10, 2013, provisional application No. 61/458,997, filed on Dec. 3, 2010, provisional application No. 61/404,335, filed on Oct. 1, 2010, provisional application No. 61/402,751, filed on Sep. 30, 2010, provisional application No. 61/459,698, filed on Dec. 16, 2010, provisional application No. 61/460,266, filed on Dec. 29, 2010, provisional application No. 61/465,160, filed on Mar. 15, 2011, provisional application No. 61/206,205, filed on Jan. 28, 2009, provisional application No. 61/208,445, filed on Feb. 24, 2009, provisional application No. 61/211,191, filed on Mar. 27, 2009, provisional application No. 61/214,672, filed on Apr. 27, 2009, provisional application No. 61/215,559, filed on May 7, 2009, provisional application No. 61/270,808, filed on Jul. 14, 2009, provisional application No. 61/276,298, filed on Sep. 9, 2009, provisional application No. 61/062,002, filed on Jan. 23, 2008, provisional application No. 61/066,372, filed on Feb. 20, 2008, provisional application No. 61/072,241, filed on Mar. 28, 2008, provisional application No. 61/062,495, filed on Jan. 28, 2008, provisional application No. 61/123,345, filed on Apr. 8, 2008, provisional application No. 61/188,175, filed on Aug. 7, 2008, provisional application No. 61/191,309, filed on Sep. 8, 2008, provisional application No. 61/198,541, filed on Nov. 6, 2008.

(56) References Cited

U.S. PATENT DOCUMENTS

2013/0256496 A1* 10/2013 Majuhas ............ B64D 11/0696
 248/503.1
2015/0047197 A1* 2/2015 Deloubes ........... B64D 11/0696
 29/897.2

* cited by examiner

Fig 1-15
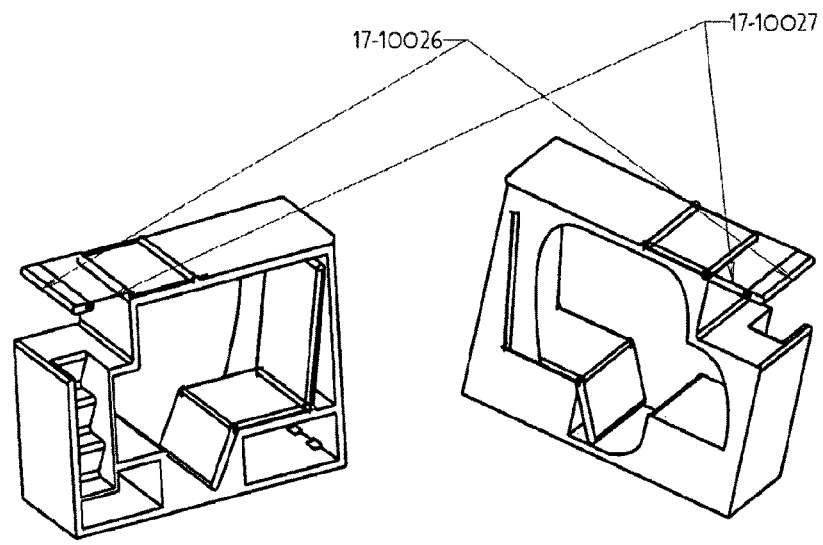
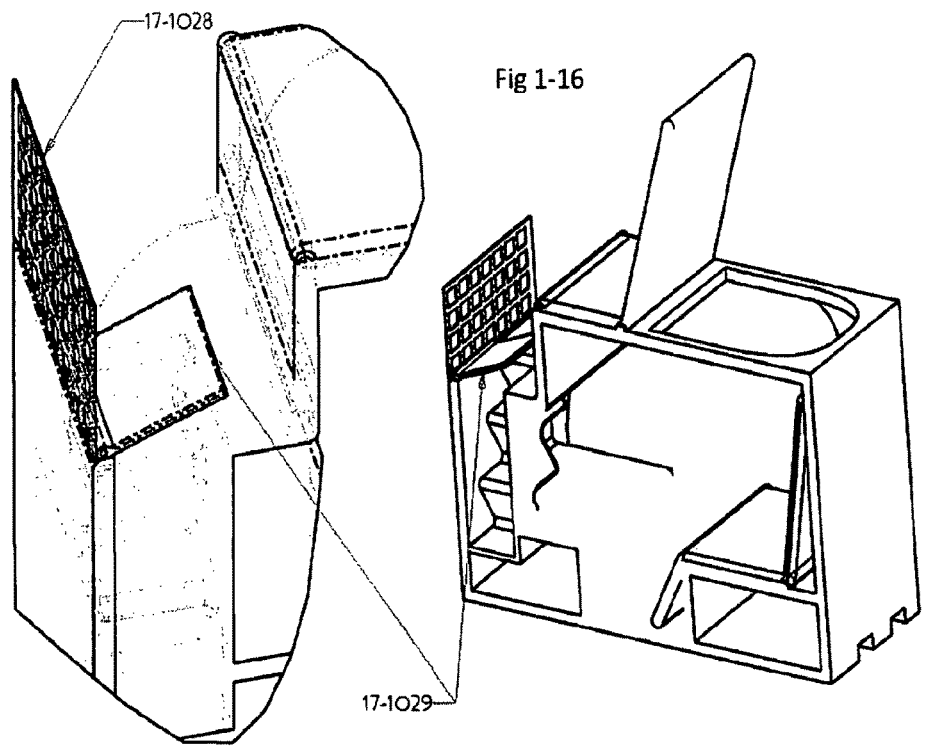
Fig 1-16

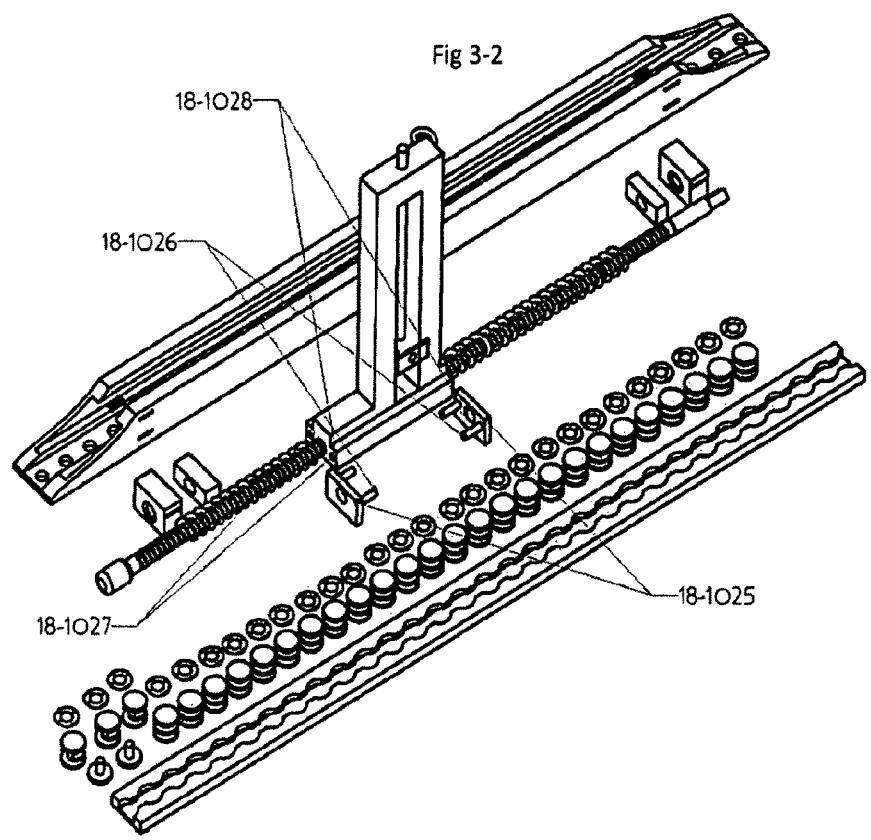
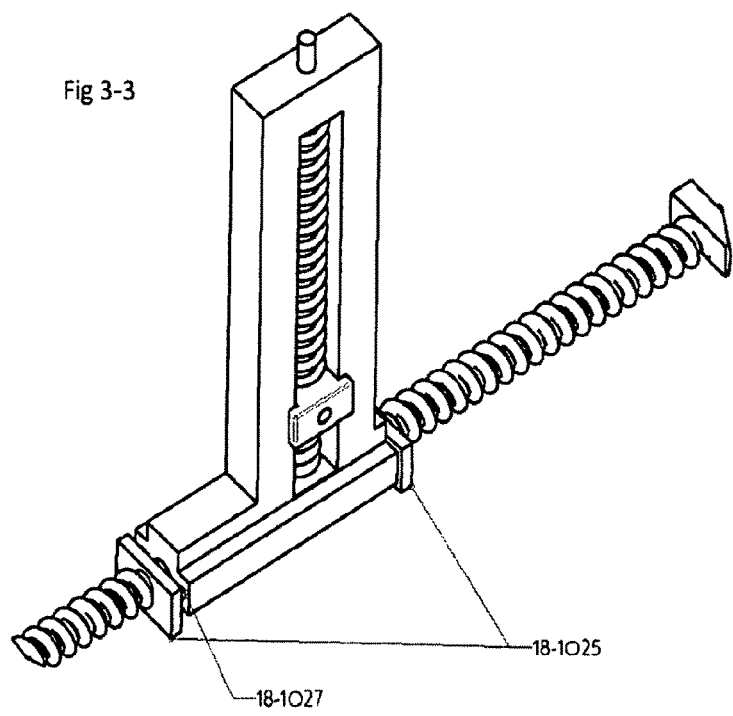

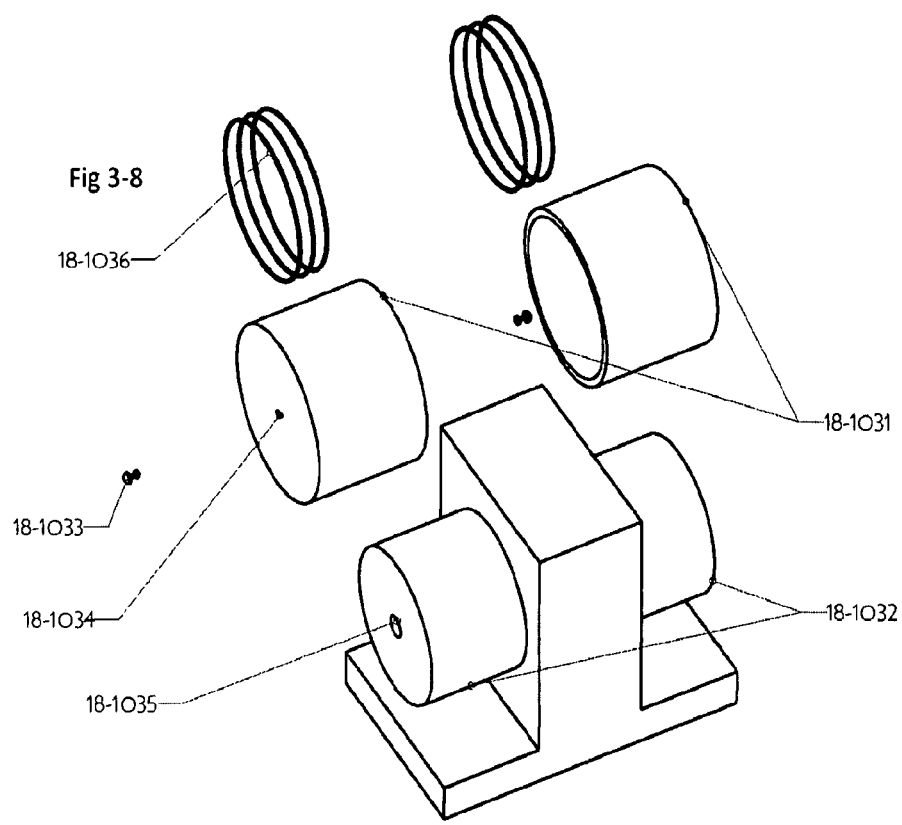
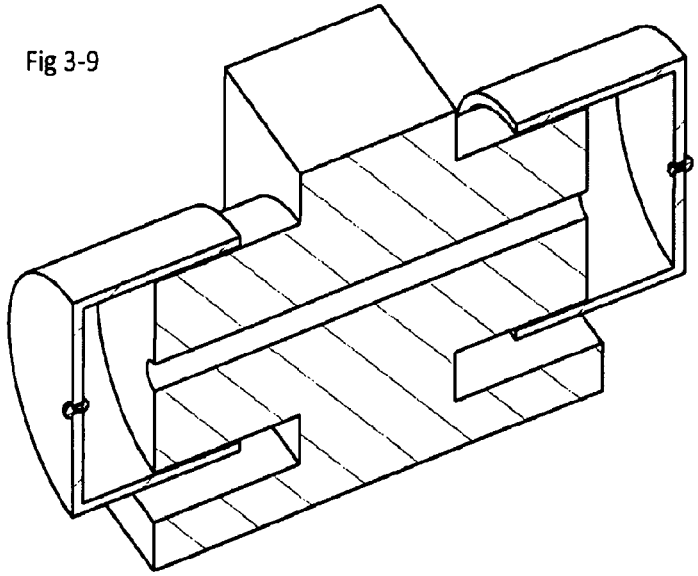

VEHICLE OCCUPANT SUPPORT

SUMMARY

The present invention provides a new structure and passenger transport paradigm for accommodating passengers in a vehicle with particular attention paid to safety, utility and provides new features for utility.

FIELD OF INVENTION

The present inventions provide a new structure and passenger transport paradigm for accommodating passengers in a vehicle with particular attention paid to safety, utility and comfort.

SUMMARY

The Drawings illustrate embodiments of the inventions. These features and more are described below. The invention relates to the referenced filed applications.

BRIEF DESCRIPTION OF DRAWINGS

AirSleeper Structure 17-1000—AirSleeper support structure
17-1001—Lower level seat bottom
17-1002—Lower level seat back
17-1003—Lower level leg rest
17-1004—Upper level seat back
17-1005—Upper level seat bottom
17-1006—Upper level leg rest
17-1007—Steps for egress and ingress—upper level
17-1008—Latch housing and aperture for load limiter and clearance for movement
17-1009—Front support aperture for support flange from rear of airsleeper mounted ahead (for front most airsleeper this may also support a latch that attaches to the tracks.)
17-1010—Seat tracks
17-1011—Support flange engaging the airsleeper structure behind (may be retractable in some embodiments to allow individual airsleepers to be removed without removing the array of airsleepers.
17-1012—shear planes to support structure under longitudinal loading
17-1013—Storage space
17-1014—Fixed leg rest for lower level
17-1015—Base provides structural support
17-1016—Front plate provides structural rigidity and support
17-1017—rear plate provides support and structural rigidity
17-1018—Track Pads, Used if there are latches only on the rear of the airsleeper behind. Takes only a compressive load. They will need to have compression characteristics to work with the load limiters in the latches. Alternative embodiments have latches on both the front and back of the Air Sleepers.
17-1019—Railings—protective in some embodiments
17-1020—Lower level flat bed position—Option 1 with seat back unchanged or changed to vertical for more space. The movement can also be used for recline positions with raised leg rest
17-1021—Upper level flat bed position
17-1022—Lower level flat bed position with seat back sliding to horizontal. This can also be used for recline position but movable leg rest 17-1003—may be substituted for fixed leg rest 17-1014. In this embodiment the seat back pivot point with the seat bottom has a support point that slides forward while the angle declines to zero.
17-1023—"Skylight" opening for lower level Air Sleeper. Closes when upper level Air Sleeper lies flat. Structurally the side sections on either side of the "Skylight" need to be robust enough to support the upper level Air Sleeper under impact conditions.
17-1024—Walkout-skylight" requires robust single support member on side.
17-1025—Center AirSleepers—no steps. Can accommodate narrow airsleepers for an Economy Class profile.
17-10026—Foot-flip can be flipped up so that passengers can pass this airsleeper to get out of the row with minimal disturbance to the occupant of this air Sleeper. End stop keeps it in line with the leg rest so it provides support rather than flip down as well.
17-1027—Short Leg rest for Foot flip attachment
17-1028—Guard rail. May have a handle to operate the stair trap door with a lever.
17-1029—Stair trap door.
17-030—Raised support structure will allow lower passengers to stand up straight AirSleeper Latch Assembly 18-1000—Latch assembly
18-1001—Foot frame (A and B represent 2 adjoining foot frames)
18-1002—Drawer slides (eg for lateral or herring bone architectures)
18-1003—Seat track
18-1004—IFE Unit
18-1005—Latch body
18-1006—Latch Plunger Pin
18-1007—Latch Horizontal guide (screw thread for adjustable version)
18-1008—Latch support frame (horizontal slider)
18-1009—Latch Support (vertical slider)
18-1010—Horizontal Load limiters
18-1011—Vertical Load Limiters
18-1012—Stud
18-1013—Nuts
18-1014—Support blocks
18-1015—Stud-contoured
18-1016—Guide-Rod
18-1017—Stud-spring
18-1018—Bolt head—(to engage tool) on 18-1007 for adjusting position of 18-1008
18-1019—Screw thread on 18-1007 to adjust nut positions and therefore the 18-1010 and 18-1008.
18-1020—aperture in 18-1008 for 18-1007 (no thread). Slides on 18-1007
18-1021—Head of 18-1007 holds longitudinal force against support block under impact conditions
18-1022—Groove on 18-1007 for clip to hold in place against support block 18-1014
18-1023—Support aperture on 18-1009 for supporting the 18-1001 A & B
18-1024—Support aperture on 18-1001 A, B for support from a pin through 18-1009
18-1025—Support flange/piston-plate
18-1026—Pistons on support flange
18-1027—Cylinders on latch support frame 18-1008
18-1028—Aperture for Latch horizontal guide 18-1007
18-1029—Vent ducts between cylinders (only one each shown can be many)

18-1030—Bleed duct (with plug not shown) for use when filling chamber with fluid.
18-1031—pair of cylinders (central piston) supported by the latch body/nuts 18-1013/load limiters 18-1010
18-1032—pairs of pistons on central support 18-1008 to the occupant or other supported structures
18-1033—plug for bleed duct on cylinder
18-1034—Bleed duct on cylinder
18-1035—vent duct through pistons
18-1036—"O" rings Vehicle Child Support

Figure 1:
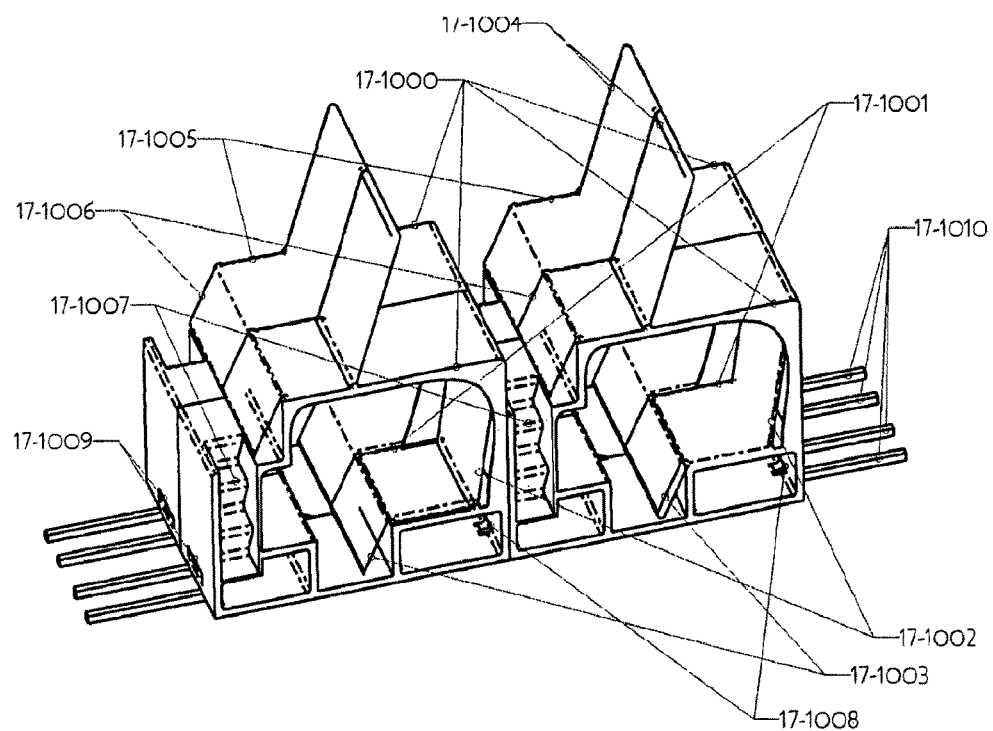

19-001—position adjustable Air-cushion assembly
19-002—Dual tether support
19-003—Handle or knob for elevation and lowering headrest/shoulder guard assembly
19-004—Shoulder guard (width adjustable in some embodiments)
19-005—Headrest (articulating in some embodiments)
19-006—Knob or handle for adjusting recline of seat for front and rear facing mode
19-007—Knob or handle for locking down anchors into cars (some embodiments have a safety mechanism such as requiring inward pressure for engagement to turn the mechanism)
19-008—Anchor such as ISO FIX
19-009—Side arms open architecture shell
19-010—Arm rests (padded in some embodiments)
19-011—Harness aperture
19-012—End-stop for recline in rear facing mode
19-013—extendable bumper for lock-down of anchors
19-014—Threaded rods (right hand and left hand on each side) for changing the angle of the seat)
19-015—Threaded rod for changing the height of the headrest/shoulder guard assembly.
19-016—Lateral Brace
19-017—mounting sleeve with screw threads for adjusting position of the air guard (aircushion) relative to the Lateral Brace Frame with mating thread.
19-018—parent cavity of air guard
19-019—child cavity of air guard
19-020—vent ducts on airguard
19-021—compressible porous materials such as foams for moderating the compression characteristics
19-022—"I-beam" flanges/end members. I-beam web at back and bottom of child seat not shown.
19-023—iso fix or are the anchor attached to pivot shaft
19-024—Pivot shaft front impact shock absorbing sleeve with deformable fingers between inner and outer surfaces.
19-025—seat surface structure
19-026—cavity holds I-Beam end members
19-027—Cutouts for Harness pass through
19-028—Cutout (optional) for headrest assembly raising mechanism. 19-029—Ribbing in I beam end sections—Also form Web for secondary (forward facing impact support) I Beam structure.
19-029—Laterally sliding (under controlled resistance) dynamic seat pad (optional)—attached to Shoulder guard.
19-030—Shoulder guard attachment of sliding seat pad.
19-031—Shoulderguard Width adjustable in some embodiments.
19-032—Articulating headrest
19-033—Frontplane support slides on front surface of seatback (not shown)
19-034—Back plane support attached through harness slots on seat back to Front plane support and slide on the rear surface of the seat back.
19-035—Harness slots on Back plane support
19-036—rod attaching links to front plane support
19-037—Links for articulating headrest.
19-038—aperture for rod connecting link to headrest There are two links left and right.
19-039—Engagement slot for shoulder guard to engage head rest on hole at center of headrest (not shown)
19-040—One or more pivotal (non threaded) supports for threaded rod 19-015
19-041—Nut for 19-015 on Seat back
19-042—Rod (pivoted at top end) or other attachment for ISOFIX/Latch anchor
19-043—Fixture for pivoting on lateral pivot axle and providing pivotal support for rod 19-042 for placement in front facing or rear facing seats
19-044—Rear bumper/tensioner (for front facing seat)
19-045—Front bumper/tensioner (for (rear facing seat)
19-046—Slider for anchor tensioning mechanism
19-047—Cam for ratcheting slider.
19-048—Notches for ratcheting slider to tension anchors
19-049—Slider sliding on lateral slide 19-050 attached to seat base
19-050—lateral slide attached to seat base
19-051—Cross arms (2) that may be pivoted together in the center and use a "scissor action" to raise and lower the threaded rod from the slide.
19-052—Pivot Shaft (may have non circular cross section to drive the central cam with the handles on the sides. Such an embodiment will need washers at all other pivotal points to convert this cross section to a circular cross section of the pivoting apertures.
19-053—nuts riding on threaded rods 19-014

AirSleeper Structure

Figures 1, 2:
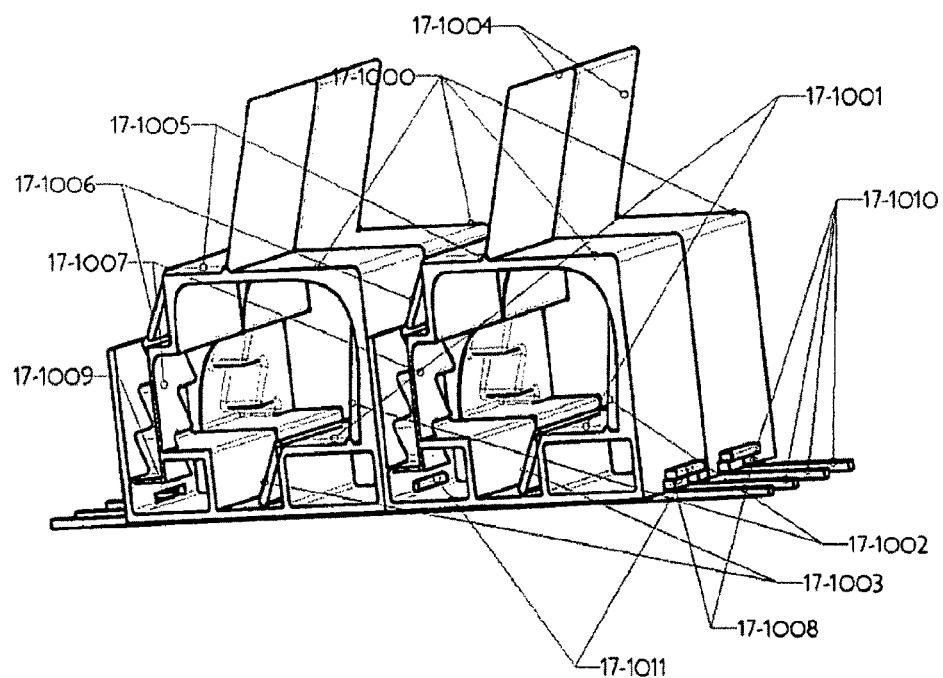
Figures 1, 2, 3:
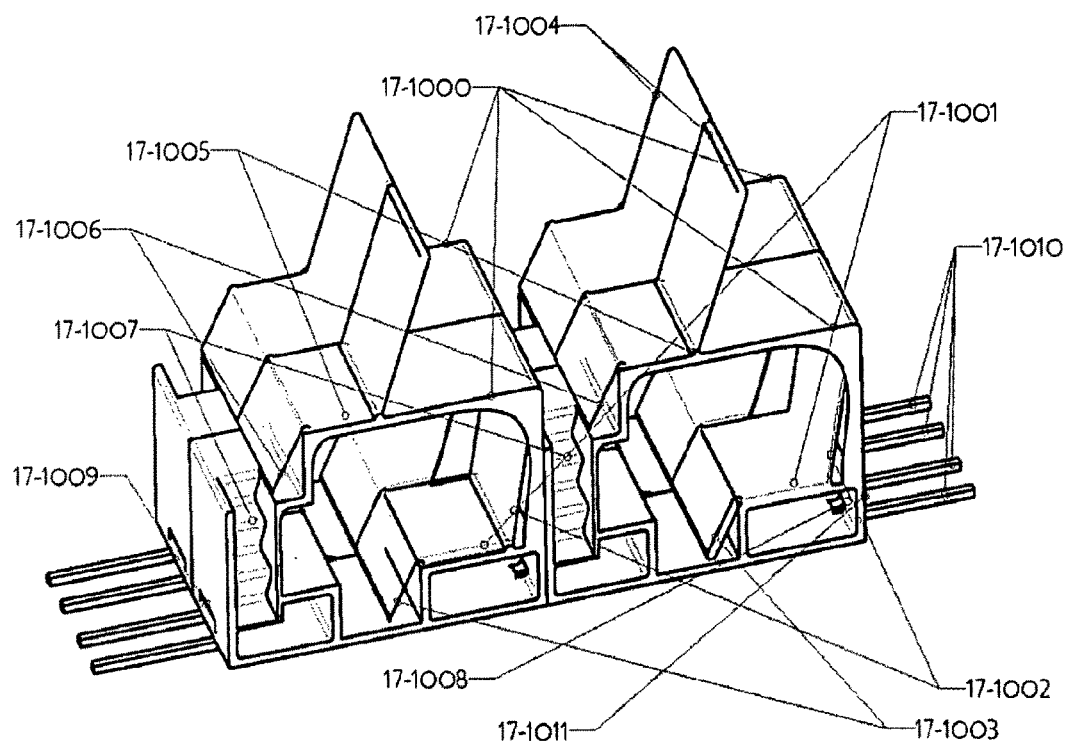

FIGS. 1-1 to 1-3 are each an assembly of forward facing Air Sleepers (notably they can be angles as well provided the lower level seat is covered by the steps and the egress area of the structure. (i.e. they can be overlapped as there is no egress ingress required adjoining the seating area of the lower level)

FIGS. 1-4 to 1-6 are of a single unit of AirSleepers with an upper and lower sleeper/seat accommodation. Notably it has steps on one side and can be deployed next to an aisle for egress and ingress to the upper Sleeper/seat.

FIG. 1-7 Shows an AirSleeper assembly with a guard rail for the upper sleeper/seats. It also shows the Sleeper/seats in a flat bed position. Notably the lower sleeper seat shows an embodiment that uses the leg rest to reorient to a bed position. This embodiment may also have a "foot" that can straighten out for a longer platform to reach the fixed leg rest. The back rest in the lower sleeper/seat can be either maintained at a steep angle or made vertical for more space.

FIG. 1-8 shows the flat bed position for both the upper and lower sleeper/seats. Here the lower sleeper seat is an embodiment that uses the seat back sliding down and becoming horizontal along with the seat bottom to make the sleep surface. Here the leg rest used for recline may not be fixed to the edge of the seat bottom.

FIG. 1-9 shows a "skylight" cut out for the lower sleeper seat, giving better visibility and perception of space.

FIG. 1-10 shows a different "Skylight" with support on the inside edge so that egress and ingress is easier for the lower sleeper seat.

FIG. 1-11, 1-12, 1-13 shows a high density (eg economy class) version of the Air Sleeper notably the stairs are only on the units that adjoin the aisles.

FIG. 1-14. 1-15 show a foot flip that can be flipped up on a leg rest while in the flat bed position to enable a passenger to "squeeze by" without disturbing a sleeping passenger. The Foot flip has an end stop in many embodiments that prevent it from flipping downwards and therefore provides support.

FIG. 1-17 Shows an embodiment where the lower passenger has more head room.

AirSleeper Latch Assembly

FIG. 2-1 shows three latches on each seat track attached to two foot frames. These foot frames are attached to occupant supports above.

FIG. 2-2. Shows the same configuration of the latches as in FIG. 2-1. The latches may be attached as in FIG. 2-1 to Foot frames or directly to occupant supports or air sleepers.

FIG. 2-3 shows a sing latch on a seat track.

Figures 1, 2, 3, 4:
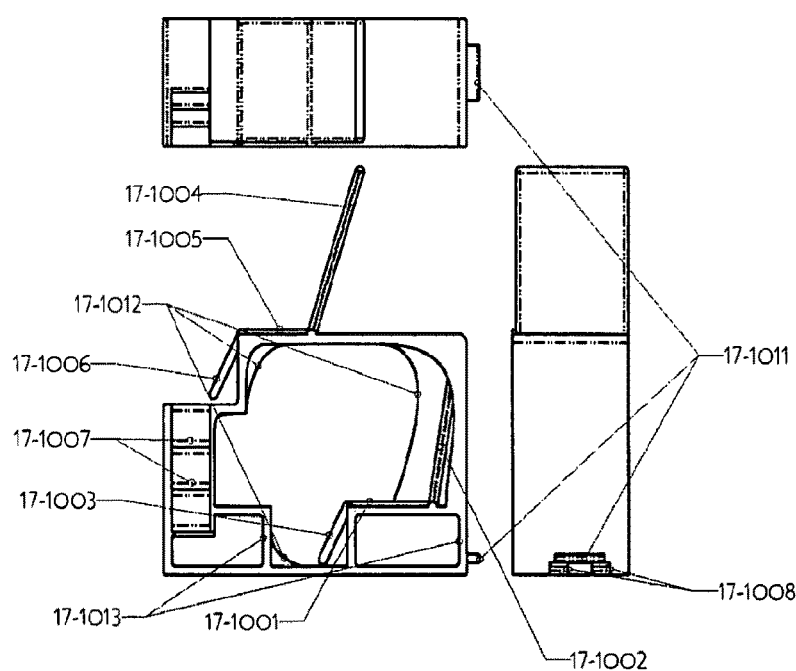

FIG. 2-4 shows two foot frames that interlock.

FIG. 2-5 shows the details of the latch assembly.

FIG. 2-6 Shows the detail of the latch assembly with the seat track removed below.

FIG. 2-7 shows the detail of the latch with the plunger shear devices and the modified studs to accommodate them.

FIG. 2-8 shows the latch detail with the latch body removed. It shows several studs with stud spring (washers) that facilitate an even loading along the multiple studs on the latch. It also shows the plunger device. The latch horizontal guide is also shown with its thread and the nut that engages it and the support block that supports it.

FIG. 2-9 shows the entire latch with the latch body removed.

FIG. 2-10 shows an embodiment of the foot frames with the attachment points to the latches.

FIG. 3-1 shows the latch including the piston plate/support flange, that engages the horizontal load limiters. The Pistons 18-1026 on this flange are inserted into the cylinders 18-1027 on the latch support frame 18-1008.

FIG. 3-2 shows an exploded view of the latch highlighting the piston plates with the Pistons and the locations of the cylinders on the lateral support frame.

FIG. 3-3 is a partial view of the piston plates and the latch support frame showing the gap between the piston plates on one or both sides to allow for a small movement in the latch horizontal guide relative to the two piston plates.

FIG. 3-4 shows the inside of the that support frame showing the cylinders and the vent duct between the cylinders connecting the two cylinders on either end it also shows the insides of the piston plates with the Pistons and the bleed duct used for initial filling of the space within the cylinders and the vent ducts with a suitable fluid. The transfer of the fluid from one cylinder to the other as a result of compression by the Pistons on one side of the let support frame with push out the piston on the other side by the same amount provided the fluid is incompressible.

Figures 1, 2, 3, 4, 5:
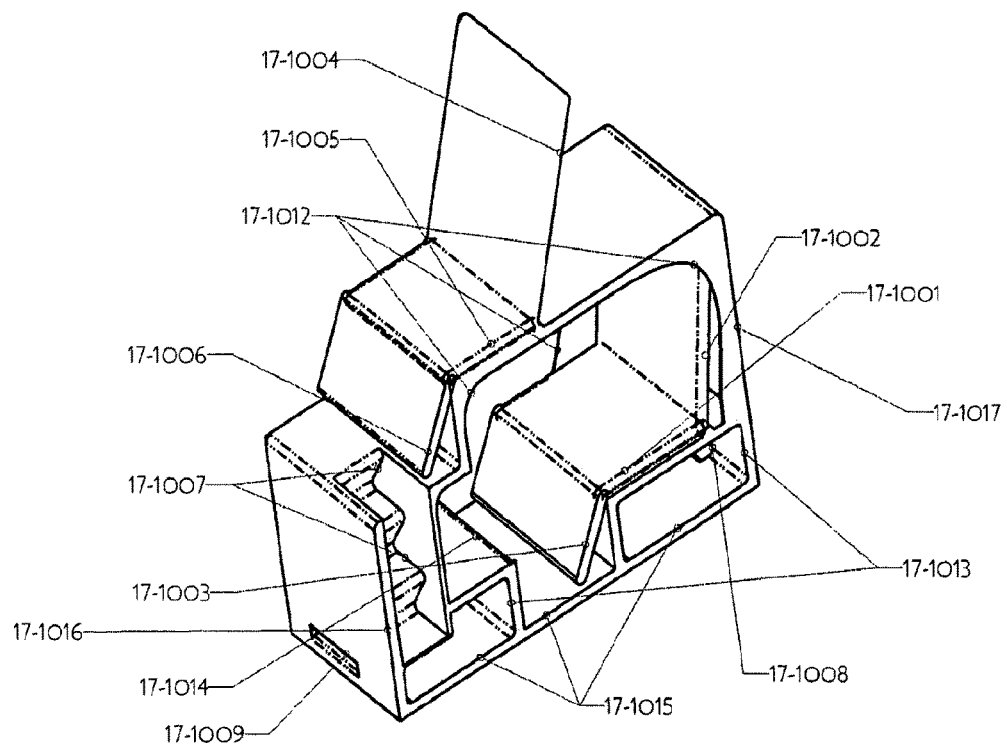

FIG. 3-5 shows a side view of the latch support frame further showing the cylinders and the connecting vent ducts.

FIG. 3-6 shows the piston plates with the aperture for the latch horizontal guide the Pistons and the bleed holes 18-1030, used for bleeding excess fluid, while filling the device with fluid. The plugs for the bleed ducts are not shown.

FIG. 3-7 shows the arrangement with central Pistons of which there can be one or more pairs, and cylinders attached directly or indirectly to the latch body.

FIG. 3-8 shows an exploded view of the arrangement with central Pistons.

FIG. 3-9 shows a cross-section of the arrangement with central Pistons in particular showing the duct between the piston faces.

Vehicle Child Support

FIGS. 4-1,4-2,4-3 show the child seat with the side-impact isolation technology the lateral air cushions the lateral brace frame with side braces, the anchor mechanism and tensioning bumpers the mechanism for changing the inclination of the seat, the mechanism for raising and lowering the seat.

Figures 1, 2, 3, 4, 5, 6:
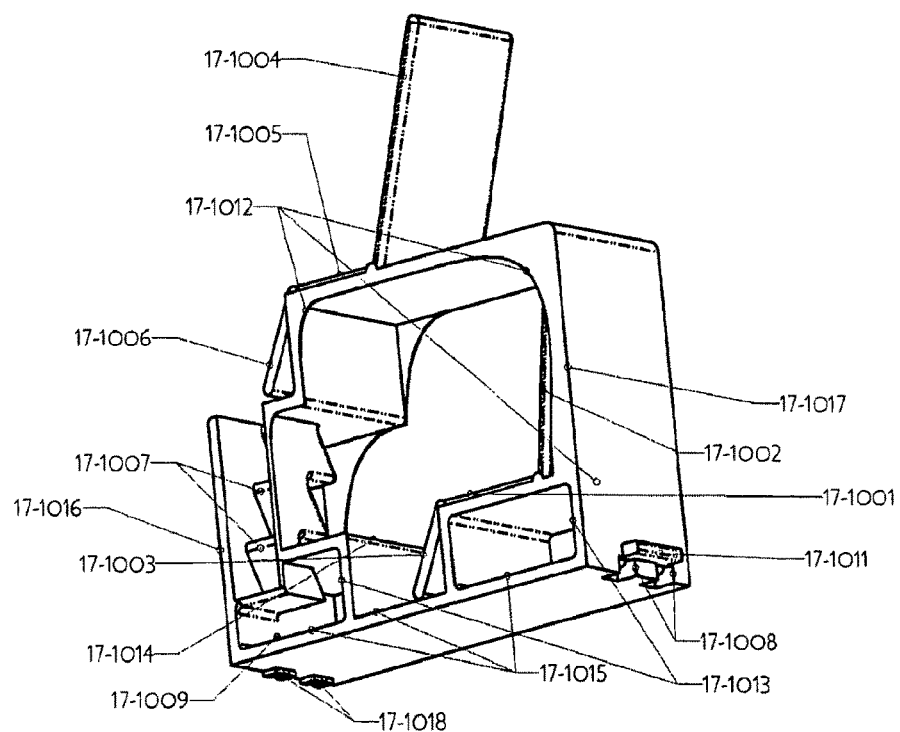
Figures 1, 2, 3, 4, 5, 6, 7:
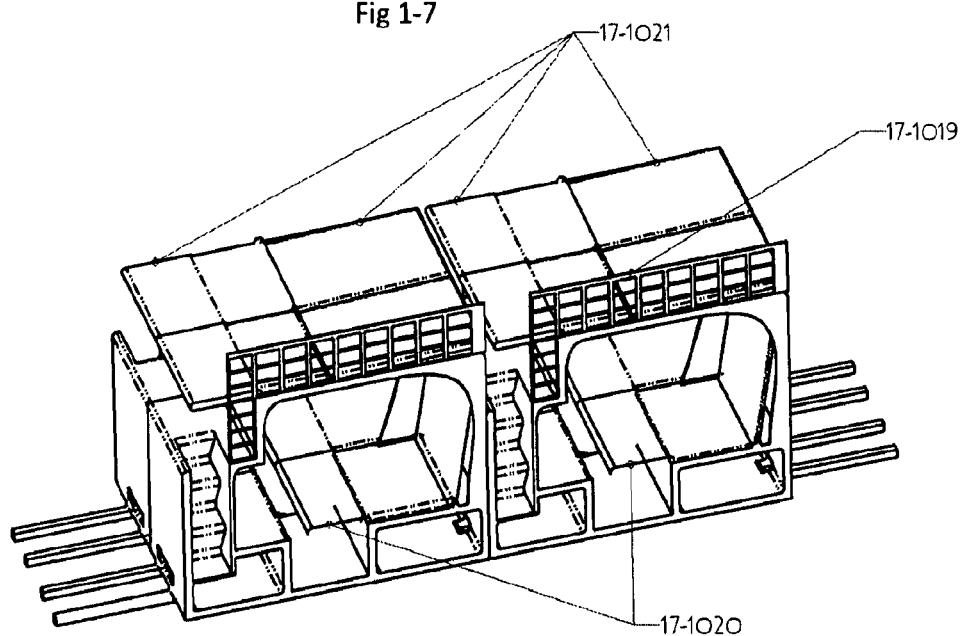
Figures 1, 2, 3, 4, 5, 6, 7, 8:
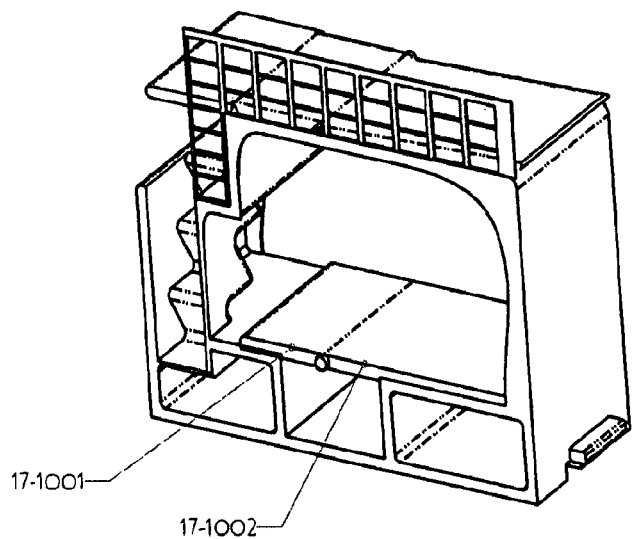
Figures 1, 2, 3, 4, 5, 6, 7, 8, 9:
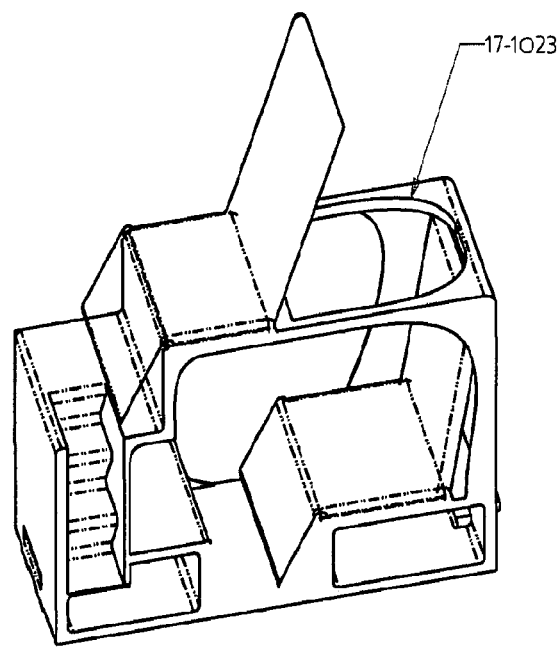
Figures 1, 2, 3, 4, 5, 6, 7, 8, 9, 10:
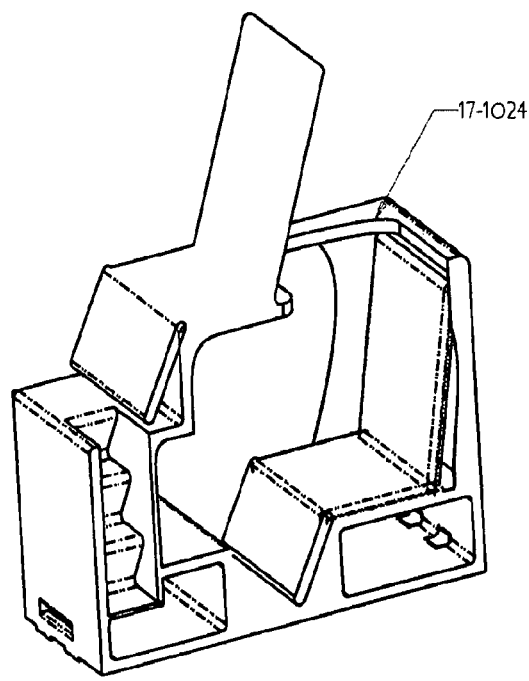
Figures 1, 2, 3, 4, 5, 6, 7, 8, 9, 10, 11:
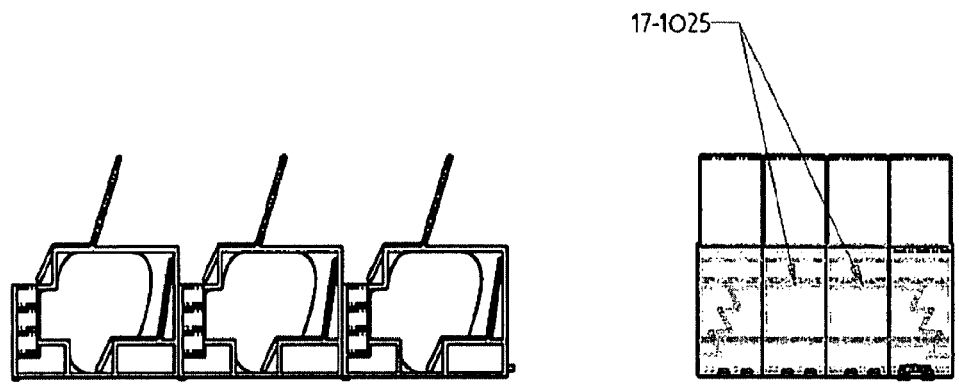
Figures 1, 2, 3, 4, 5, 6, 7, 8, 9, 10, 11, 12:
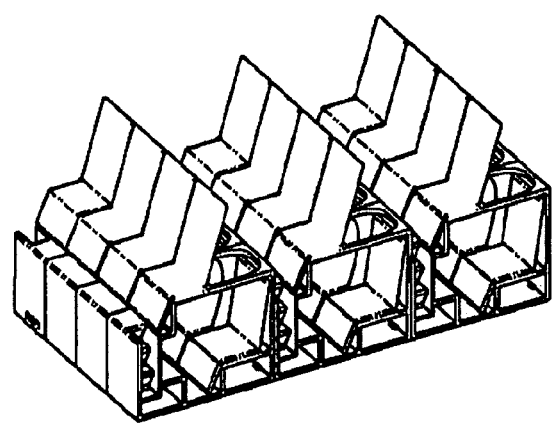
Figures 1, 2, 3, 4, 5, 6, 7, 8, 9, 10, 11, 12, 13:
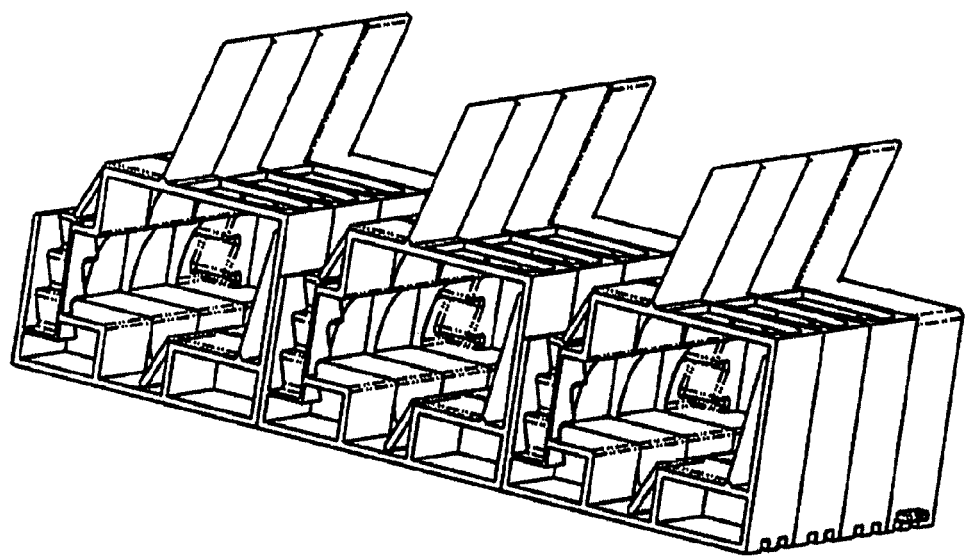
Figures 1, 2, 3, 4, 5, 6, 7, 8, 9, 10, 11, 12, 13, 14:
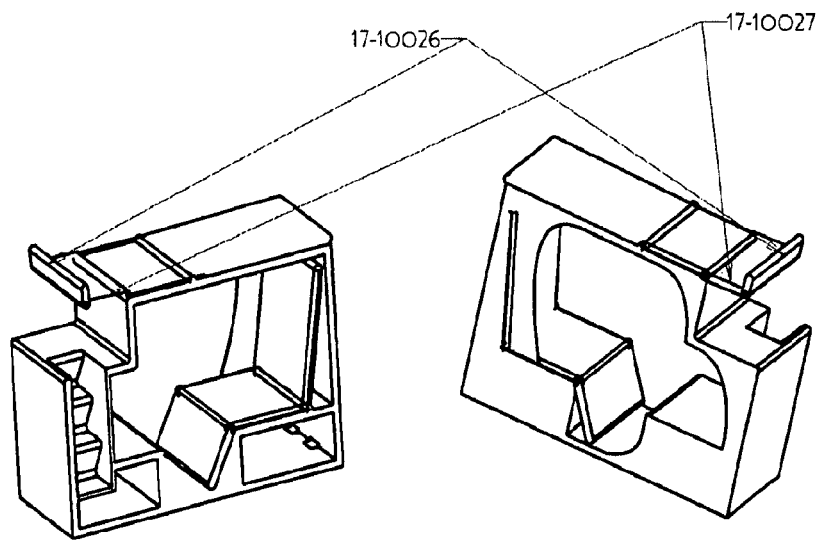

FIG. 4-4, 4-5,4-6 show the adjustable side-impact air cushion mounted on the side brace. FIG. 4-4 shows the screw thread that allows movement of the unit in and out of the lateral brace. FIG. 4-5 shows the unit detached with vent hose shown. FIG. 4-6 shows a cross section of the unit in one of the embodiments. Notably, the air cushion may have multiple telescoping piston cylinder arrangements rather than the single piston cylinder arrangement shown in the figure. Most embodiments will require a predetermined force to enable movement of the Pistons relative to the cylinders. In some embodiments a compressible material or a porous material such as form may be included in the cavities to moderate the compression characteristics of the air cushion.

FIGS. 4-7, 4-8, 4-9 illustrates the lateral I-beam structure (primary I-beam). Items 19-022 form the flanges of the primary I-beam as shown in FIG. 4-7. The I-beam flanges may take many different cross sections. FIG. 4-8 shows the profiles seat with back and bottom serving as the web of the I-beam. In this embodiment the flanges of the I-beam are inserted into cavities at the ends of the I-beam web. In another embodiment shown in FIG. 4-9, the I-beam flanges are formed of the same material as a web of the primary I-beam and may be removed as shown to save weight.

FIGS. 4-10, 4-11, 4-12, 4-13 show different embodiments of the dynamic subassembly for the "side-impact isolation technology".

FIG. 4-10 shows the articulating headrest, shoulder guard which in some embodiments may be adjustable for width, and dynamic seat pad. FIG. 4-11 shows the same structure with the profiles seat removed revealing the connection of the dynamic assembly to the support structure within the headrest assembly. The entire dynamic subassembly except for the seat pad and its attachment to the remainder of the dynamic subassembly move up and down with the mechanism for changing the height of the headrest. The dynamic seat pad is attached to this dynamic subassembly with a vertically sliding mechanism (not shown) such as a slot and a pin to allow the vertical movement of the headrest but maintain the coupling for lateral movement of the dynamic seat pad to the shoulder guard.

FIG. 4-12 shows an embodiment without a dynamic seat pad, using the inertial loading on the shoulder guard for articulating the headrest. FIG. 4-13 is an exploded view of the dynamic subassembly showing one of the two links attaching the articulating headrest to the front plane 19-033 and the central connection 19-039 between the shoulder guard and headrest. The backplane 19-034, along with the front plane 19-033, sandwich the seat back (not shown), and are therefore able to transfer front impact loadings to the seat back.

FIG. 4-14 shows the components of the mechanism for raising and lowering the headrest assembly which includes the shoulder guard and the harness supports. This embodiment uses a backplane 19-034 and a front plane 19-040 sandwiching the seat back, with attachments to each other through the slots that are also used to enable the harness to have a part from the front to the back of the seat. This architecture follows the extensive background art on sliding mechanisms that need to transfer loads such as in sides on lathes, and milling machines. The threaded rod 19-015 has one or more pivotal attachments to the front plane and on the backplane (which moved together), and did not arrangement on the seat back 19-041.

It may be seen on the front plane that are sections on the back surface of the front plane that engage the slots on the seat back for slidable motion.

FIGS. 4-15 to 4-17 show different aspects of the mechanism for securing the anchors firmly to the vehicle.

FIG. 4-15 shows the anchor mechanism such as ISOFIX 19-008, and its attachment means to the pivot shaft 19-024. The attachment 19-042 may be in some embodiments around which is pivotally attached to a fixture 19-043, which in turn is pivotally attached to the pivot shaft 19-024. This enables the anchor point to be rotated about the axis of the rod 19-042 and also rotated about the axis of the pivot shaft 19-024. This accommodates the use of the anchor for both forward and backward facing orientations of the seat.

FIG. 4-16 shows the seat base with the components for tensioning the anchors. Handles on knobs 19-007 are used to twist the pivot shaft 19-024 which in turn will rotate the cam 19-047, which in turn will engage the slots 19-048 on one or the other side of the slider 19-046. For bracing the seat and tensioning the anchors in a front facing position the rare bumper 19-044 is pushed out by ratcheting the cam into slots on the rear side of the cam. For tensioning the anchors and bracing the seat in a rear facing position the cam is rotated to engage the slots on the front side of the cam, thereby pushing the slider forward and the front bumper outwards.

FIG. 4-17 shows a cross-section of this arrangement.

FIGS. 4-18 and 4-19, show the mechanism for changing the angle of the seat relative to the seat base. The mechanism is enabled by the rotation of the handle on knobs 19-003 that rotates the dual threaded Rod 19-014, which has a right-hand thread on one side and the left-hand thread on the other side. Nuts riding on this dual threaded Rod are thereby moved either together or away from each other. This movement is harness by the cross arms 19-051, that may be pivoted together to form a scissor action, and pull in or out the sliders 19-049 sliding on the slide 19-050. As the scissor arrangement closes the lateral slide 19-050 is pushed away from the dual threaded Rod 19-014 thereby pushing the seat away from the seat base. This movement in conjunction with the pivotal attachment of the seat to the seat base with the pivot shaft 19-024 tilts the seat upwards or downwards. Notably there will be forces on the lateral slide and the dual threaded Rod to "bow" them upwards or downwards depending on compressive or tensile loads of the seat relative to the seat bottom. Some embodiments use a central support on one of both of the slider and the dual threaded shaft using the ribbing topology of the seat and the seat base to prevent this phenomenon. End stops for the rear facing extreme position is enabled with protrusions on the seat and the seat base, that engage each other 19-012. The ends stop for front facing may be the seat contacting the seat base.

FIG. 4-19 shows the arrangement with the seat removed. The dual threaded rods are of course attached to the seat and travel down into the seat bottom with notches as shown.

DETAILED DESCRIPTION OF INVENTION

AirSleeper Latch Assembly

The latches attach to the seat tracks with studs 18-1012 and plunger shear devices 18-1006. The studs provide support for vertical loadings both compressive and tensile. The tensile loadings are borne by the lip sections of the track. The studs are free to slide within the track groove and are placed to be approximately at the center of each of the lip pairs. Typically there will be multiple such studs that are distributed over the length of the latch body. Some embodiments have the studs rigidly attached to the latch body. The preferred embodiment has the studs supported by a stud spring (washer) 18-1017 that is between the upper flange of the stud and the latch body, thereby providing a load limiting function. This load limiting function will help equalize the forces on the studs along the latch body even if there is a small distortion along the length of the Latch body. Typically there will be a distortion as a result of the high loading in the center of the latch that is then distributed along the latch body to the studs.

The Shear plunger device or Latch plunger pin 18-1006 provides longitudinal support for the latch. Some embodiments may have the plunger pin braced on one or both sides by studs that are cut out to allow withdrawal of the plunger pin. Some embodiments of the plunger pin are attached by screw threads to the latch body and can be lowered into an engaged position or raises to disengage and thereby move the latch along the rail to remove the studs through the apertures in the track.

While the plunger pins may be located at any point along the latch body and in fact located in several locations along the latch body, the preferred embodiment has multiple plunger pins at the "aft" end of the latch. This is so that longitudinal loading is tensile along the latch body.

The attachment points for support for either the foot frames or the direct attachment of the occupant supports or the airsleeper units, is the aperture on the Latch support (vertical slider) 18-1009. The attachment is with a pin that extends through apertures in two adjoining foot frames or occupant supports as shown in FIG. 2-10. Other attachment mechanisms well disclosed in the back ground art may also be used.

Vertical load limiting can be one or both of compressive and tensile. Some embodiments may not have vertical load limiting and the Latch support 18-1009 may be directly attached to the Frame 18-1008. The embodiment shown has both. These load limiters may be of any form including spring dampers, crushable members or other means for load limiting well disclosed in the background art. The reaction force of the load is borne by the Latch support frame 18-1008. This frame slides in the latch body 18-1005 in the longitudinal direction and is supported at either end. The support may be rigid or may on one or both side be a load limiter. The Load limiters may be spring dampers, crushable members or other forms of load limiters disclosed in the background art. Some embodiments have the load limiters directly attached at the other end to the latch body, thereby transferring the force of the frame as it slides in the latch body through the load limiters to their other end and from there to the rigidly attached support block.

However other embodiments may have an adjustable position for the horizontal location of the Latch support frame with regard to the latch body. This is useful when the support point on 18-1009 needs to be aligned to the supported objects. The embodiment with this adjustment is enabled with a screw thread on the Latch horizontal guide 18-1007 that has two nuts 18-1013 riding on it supporting the ends of the two load limiters away from the frame. The Frame has an aperture to accommodate the 18-1007 but no thread. It simply slides. Notably as the screw is turned the two nuts will move in the same direction by the same distance thereby moving the two load limiters and the frame by that same distance. The Latch horizontal guide is supported by the support blocks 18-1014 at either end.

Considering that the main longitudinal load during impact is towards the "fore" end of the latch the bulbous head of the 18-1007 braces against the support block to transfer the needed longitudinal resistance force. This bulbous end is at the "aft" end of the latch horizontal guide 18-1007. At the fore end the support to the support block may be provided by a clip washer in a groove a cotter pin on the 18-1007 or other longitudinally braced devices attached tot eh 18-1007. The end of 18-1007 has a "bolt head" 18-1018 to engage a tool for moving the support point as required. The tool may use a flexible shaft for access or a angled bevel geared arrangement for access.

The foot frames are designed to interlock so that the same attachment point to the latch can be used for two adjoining foot frames.

Similar arrangements can be sued for direct attachment to occupant supports or airsleeper modules.

The foot frames in the embodiment shown have apertures in their middle to accommodate baggage. Some of the arrangements for baggage use a drawer 18-1002 that can be pulled out. FIG. 2-1 shows the support rails for such drawers. The upper surface of the foot frames may have one or more sockets and/or pins that interlock with the occupant support above. Cotter pins may be used to secure these in place as shown in FIGS. 2-1 and 2-4 in this case for the center sockets on the aft side and the fore most sockets on either side.

The design has a place of the IFE unit 18-1004 rear (or forward) of the baggage space.

The invention adds additional functionality to the above structure as follows.

FIG. 3-1 shows the latch arrangement where the load limiters on the inner ends engage the piston plate/support flange. This piston plate 18-1025, has a central hole through which 18-1007 passes and has one or more Pistons that engage cylinders on the lateral support frame/horizontal slider. Notably other embodiments may have other structures which have horizontal movement and engage the occupant support and are attached to such cylinders that engage the Pistons on 18-1025. FIG. 3-2, 3-3, 3-4, 3-5, 3-6 shows the operational details of the Pistons in their cylinders.

The arrangement of the piston plates that are supported by the load limiters rather than having the load limiters engage directly with the 18-1008 serves an important function for some embodiments of the latch. It may be necessary to accommodate slight variations in the length between latches on the supporting tracks. Such changes in lengths on aircraft in particular can arise from differential pressure between the cabin and the ambient pressure at high altitudes. Such changes in pressure differentials from ground level to high altitudes can stretch the shell of the act refuse a large and in fact all the material support structures within the fuselage. This could result in an increase in the length of the seat track between support points by the latches disclosed herein. Therefore there is a need to change the position of support of the occupant support or other structures along the length of the aircraft by a small incremental displacement as such expansion and contraction happens in the fuselage with pressure differential changes. The movement of the latches with the movement of the supporting plungers 18-1006, on adjoining latches should not affect the distance between support points on the occupant supports or other structures supported by the latches. The arrangement with the pairs of Pistons, one on either side of 18-1008, engaging cylinders in 18-1008, wherein those cylinders have a vent duct between them, and where the cylinders and vent duct are filled with a substantially incompressible fluid accommodates this need. It works as follows. When the track expands the plungers 18 1006 moves with the track, taking with it the latch body. However, the attachment point to the occupant support or other structure need not in the same way. Therefore there is a differential movement between the 18 1008 and the latch body and the load limiters it supports. The piston plates 18-1025 move with the load limiters, thereby moving the Pistons in and out of the cylinders on 18-1008. If tensile loadings are not designed into the attachment of the load limiters to the piston plates, the first of the pair of Pistons which is compressing the fluid in the cylinder will result in the fluid passing through the vent duct into the other cylinder where the second of the pair of Pistons will be pushed out. This results in the mechanism functioning well even in the absence of a tensile attachment of the load limiters to the piston plates. Notably, the pressure changes in the aircraft takes several minutes to happen as the aircraft increases altitude. There is time for the fluid to flow through the vent duct 18 1029 in that timeframe. The viscosity of the fluid will determine how quickly the fluid can flow through the vent duct for a given differential pressure between the ends of the vent duct. During impact conditions however the situation is very different. There is a high force that will propel one piston plate towards the cylinder. In this timeframe the viscosity of the fluid will limit the amount of fluid that can flow through the vent duct. Therefore the piston will not move substantially in the cylinder thereby transferring the force from the load limiters to the Central support member of 18-1008 which supports the occupant support or other structures.

In another embodiment, the fluid may be a compressible fluid such as a gas, and can in fact be air. This will result in the piston cylinder arrangements with the vent ducts, acting as a load limiter as well. Therefore during the ascent of the aircraft to high altitudes the average flow freely between the cylinders, thereby not providing a resistive force when the Pistons move in the same direction (in opposite sides of the structure 18-1008). However, when an impulsive load is received by the piston cylinder arrangement from the load limiters 18-1010, they will resist the motion as and moves from the near cylinder to the far cylinder through the vent duct. The design of this load limiting device/differential movement device, in this embodiment will need to address the compressible properties of the gas/air in design of the cross sections, volumes of the cylinders and the diameter and length of the vent duct.

Yet another embodiment may not have the horizontal load limiters 18-1010, but simply have the air compression load limiters as noted above. The piston plates in that embodiment would be directly supported by the nuts 18-1013, or in other embodiments directly to the latch body.

Considering, that the piston cylinder arrangement with the vent duct can in itself be used as a position adjustment mechanism for the Central support 18-1008 relative to the latch body, the screw thread arrangement in some of the noted embodiments may not be needed. The slow movement of the Central support 18-1008 which in some embodiments is a latch support frame, during the assembly process of the occupant supports or other support structures can be accommodated by the movement of the cylinders relative to the Pistons. This is the case for both the use of an incompressible fluid or a compressible fluid such as air which can also have load limiting properties.

In the embodiments that use air or gas as a load limiter in the piston cylinder arrangement, particularly where there is no need for the load limiters 18-1010, or in particular where the guide 18-1007 is not required, the latch horizontal guide 18-1007, may not be necessary. The one or more pairs of Pistons may be directly supported by the nuts 18-1013 or the latch body itself. In other embodiments load limiters 18-1010 can be deployed with this air shock arrangement as well without the central latch horizontal guide 18-1007. In the event that the central guide 18-1007 is required that can be accommodated in other embodiments where the piston cylinder arrangements straddle the central arrangement for the load limiters. This will be very much like FIGS. 3-1 to 3-5 except that the cylinders are on the sides with the pistons and straddle the guide 18-1007.

In yet another embodiment pairs of cylinders may be supported by the nuts 18-1013 or the latch body, wherein these pairs of cylinders engage the central member 18-1008 which in some embodiments is a latch support frame and supports the occupants or other support structures, wherein the central member has on either side Pistons that ride in the pair of cylinders. The Pistons between their front faces in the cylinders need to have at least one duct connecting those front faces between the Pistons in each pair thereby providing a path for the fluid to flow between the chambers created by the pairs of Pistons and cylinders.

While not shown in some of the figures in any of the piston cylinder arrangements, there could be "O" rings, to minimize leakage of fluid from the piston cylinder arrangements.

During assembly, of any of the piston cylinder arrangements there is a need to fill the piston cylinder chambers and the vent duct with the fluid while one piston is in place. The second piston can then be inserted. To allow fluid to escape while the second piston is moved into position, a bleed duct 18-1030 may be necessary. This is shown in FIG. 3-6. A plug may then be inserted into the bleed duct to prevent fluid from escaping after the assembly is completed.

Still other embodiments may have valves off flaps that prevent the flow of fluids through the vent duct during impact conditions where the pressure differential is high. The sudden increase in pressure on one side of the flap will move the flap towards the aperture of the vent duct and thereby closing of. During times of gradual motion of the fluid the fluid does not have adequate farce against the flap or other valve embodiments to close the aperture.

AirSleeper Structure

This embodiment of the Air Sleeper two sleeper/seats on each unit. With egress ingress on the side of the unit. They may be installed forward facing along the aisle of an aircraft. They may also be installed at an angle to the isle of an aircraft where the steps and the egress ingress area of the lower passenger are not blocked. (i.e. achieved by covering only the seat area of the lower sleeper/seat with the AirSleeper unit aft of it.
Track Loadings A critical part of the design of the AirSleeper is to ensure that the track loadings do not exceed allowable loadings—both compressive and tensile. To achieve this embodiment in this invention has interlocking arrangements between the units so that potential tensile and compressive loadings on the seat tracks are mitigated. A minimal Latch arrangement would be one or the other of the front and back of the Air Sleeper unit, the end without a latch will derive support from the interlocking arrangement between the airsleeper units. In such a case compressive load s will still need to be accommodated on the seat tracks with suitable pads rather than the need for latches. For example if the Latch is on the back of an AirSleeper unit to control the tensile loading, and that end is attached to the front of the AirSleeper unit aft of it, then the front of the AirSleeper unit aft of it will need to have a pad that rests on the tracks to transfer at least some of the compressive forces. Some embodiments of this invention also use load limiters for one or both of vertical and horizontal load limiting. These are attached to the AirSleeper unit with clearances adequate to allow the movement of the AirSleeper under load relative to the fixed end of the latches on the tracks.

To distribute the load further on the tracks more pairs of latches along the length of the AirSleeper units, may be used (eg every 16" as in conventional seats.)

In the event of airframe distortion under impact loading the interconnected AirSleeper units may be designed to be rigid with the load limiters taking up the distortions.

Interconnections between the AirSleeper units have a slot and flange arrangement. These will also support lateral forces to keep the AirSleeper units aligned.

Some embodiments may have retractable flanges that can enable the removal of an individual airsleeper without removing the entire array.

The front and rear plates of the units can provide structural rigidity if desired. Small distortion gaps between the front plate and the back plate of the adjoining unit, can also be used to allow limited distortion between the axially arranged airSleeper units. These spaces may also have load limiters installed in the gap space (such as crushable members of aluminium honeycomb) to control the distortion. The units may also be attached separate to each other but will then transfer higher tensile and compressive loads to the tracks.

Each aircraft has different track positions. The AirSleeper units will accommodate the exact position of the tracks for the latch fasteners. In some high density embodiments, AirSleeper units may be attached to each other laterally to allow lateral support in the event of inadequate tracks under each airsleeper unit.

Some embodiments of this air sleeper structure can comprise a single unit as the dimensions may be adjusted to ensure that base of the unit is long enough along the axis of the aircraft to support the moment of the upper and lower occupants under crash loading conditions. Such an embodiment will have tension capable latches at the aft end and compression capable latches or supports at the fore end.
Architecture A notable aspect of the AirSleeper units in this invention is that the foot level is below the head level of the lower level sleeper/seat.

Thereby making the entire unit lower allowing easier egress and ingress for the upper occupant and also allowing easier service by cabin crew who even at 5' should in many embodiments be able to see the sleep surface of the upper passenger entirely.

The AirSleeper units may be attached to each other at one or more levels above the tracks to increase structural strength and to transfer the alternating tensile and compressive loads between units that would otherwise be transferred to the tracks.

Severe longitudinal loadings will be encountered under crash conditions. While completely open sides may be preferable in some embodiments, shear planes are incorporated in many of the embodiments to ensure that the structure can with stand the loadings particularly due to the upper occupant.

The support structure for the upper sleeper/seat in many embodiments will use a strut or a plate reaching to the back of the unit forming the all or part of a ceiling of the lower occupant support space. Often a narrow single or a couple of struts placed in the center or towards a side of each unit as in FIG. 1-9, 1-10 will suffice. The trade off is that the lower occupants—particularly away from the aisle, will need to stoop to get out of their Sleeper/seat units. While a AirSleeper unit without this support to the back end may be designed, it will become heavier and therefore less attractive. FIG. 1-17 Shows an embodiment where the lower passenger has more head room. The support structure does not obstruct the backrest of the upper passenger. This arrangement may be such that the front of the lower seat bottom is behind the back edge of the upper seat bottom (ie the vertical plane through the back edge of the upper seat bottom) This will give standing space without stooping if the rear edge of the upper seat bottom if far enough ahead of the front edge of the lower seat bottom for foot space on the floor and vertical standing above that foot space. Of course the sleep position of the upper passenger will limit head room for the lower passenger. If the storage area under the lower sleeper/seat is reduced in width, it is possible to fold up the seat bottom of the lower seat when not in use to facilitate full standing height for occupants in the lower tier when the upper Sleeper seat is either in sitting or a limited recline position. Moreover, if the length of the Airsleeper units are increased by a few inches (thereby reducing the density however), and the lower storage is substantially reduced from under the lower sleeper/seat the lower sleeper seat can be folded to allow full standing height for the lower passenger when the upper sleeper seat is in a sleep position. It is however unlikely that the upper passengers are sleeping while the lower passengers are all mobile. It will now be necessary for the adjoining lower passenger next to aisle to stand up and allow passage to the middle passenger. It may be less complicated for the middle passenger to simply stoop and get out without disturbing the aisle passenger in a sitting or recline position.

Notably, the architecture may use the entire length of the units for accommodating the passengers in the sleep position. No space is lost with steps.

If less longitudinal space is available for each unit as in a high density deployment, the sleepers may offer one of angled flat beds where the seat bottom/seatback connection is raised to allow a flat surface as a hypotenuse to a shorter base length or steeply reclined seats that are nearly flat.

The architectures shown in the figures have two types of lower sleeper/seat configurations for the bed position. One simply has a leg rest that rises (with an optional extension foot) to bridge the gap to the fixed leg rest. Here the seat back may be straightened to become vertical to give more longitudinal space. In another the seat bottom is on slides and the seat back lower edge is attached to the same slide and the can move forward to get the seat back to a flat bed position while bridging the space between the seat position and the fixed leg rest position with the sliding movement.

Figures 1, 2, 3, 4, 5, 6, 7, 8, 9, 10, 11, 12, 13, 14, 15, 16, 17:
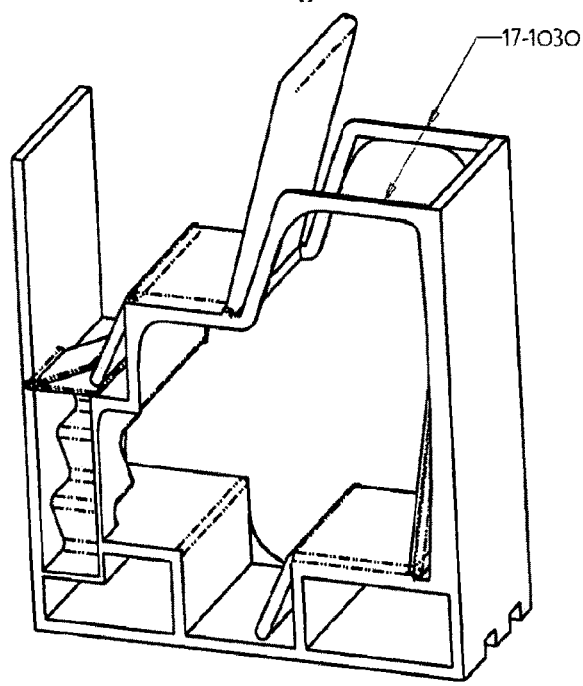
Figures 1, 2:
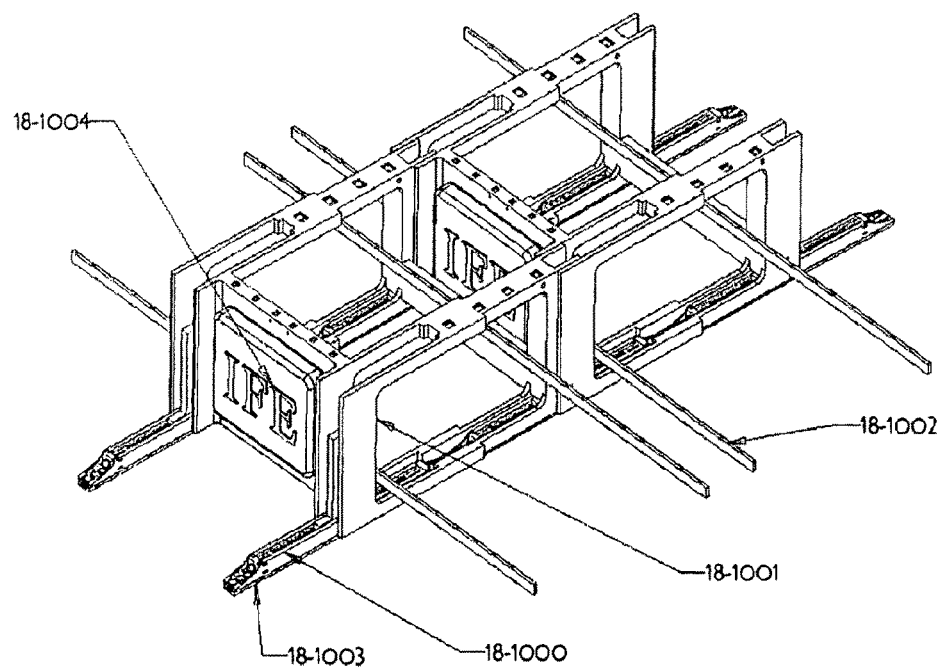
Figure 2:
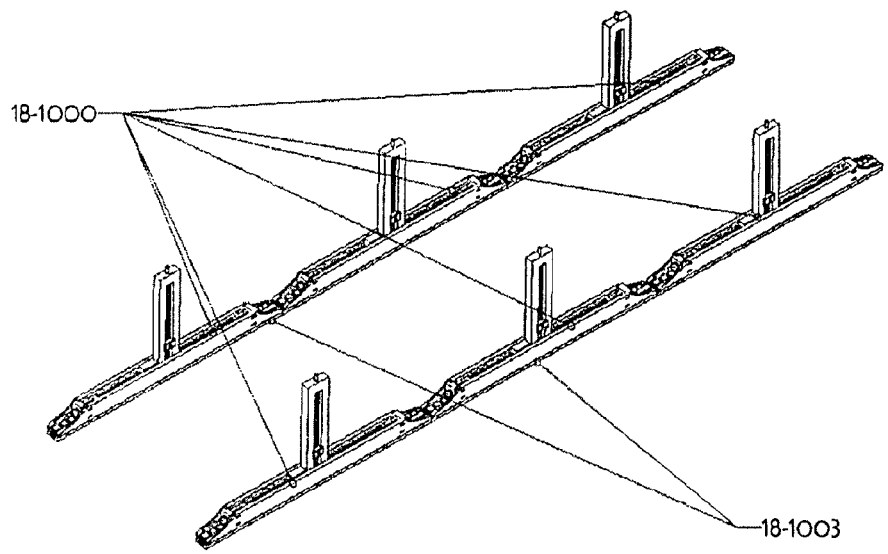
Figures 2, 3:
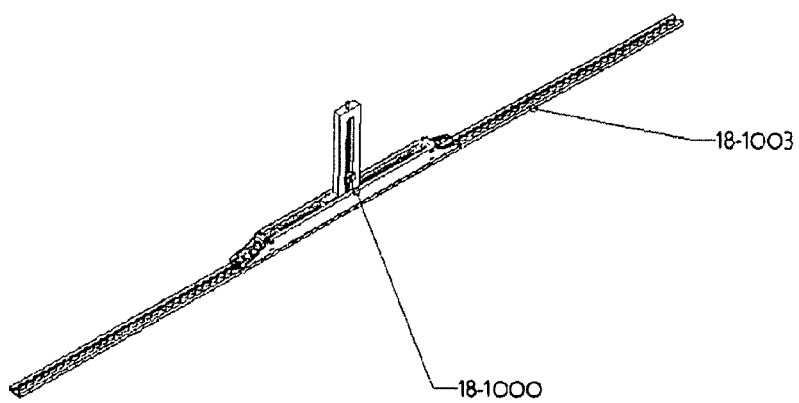
Figures 2, 3, 4:
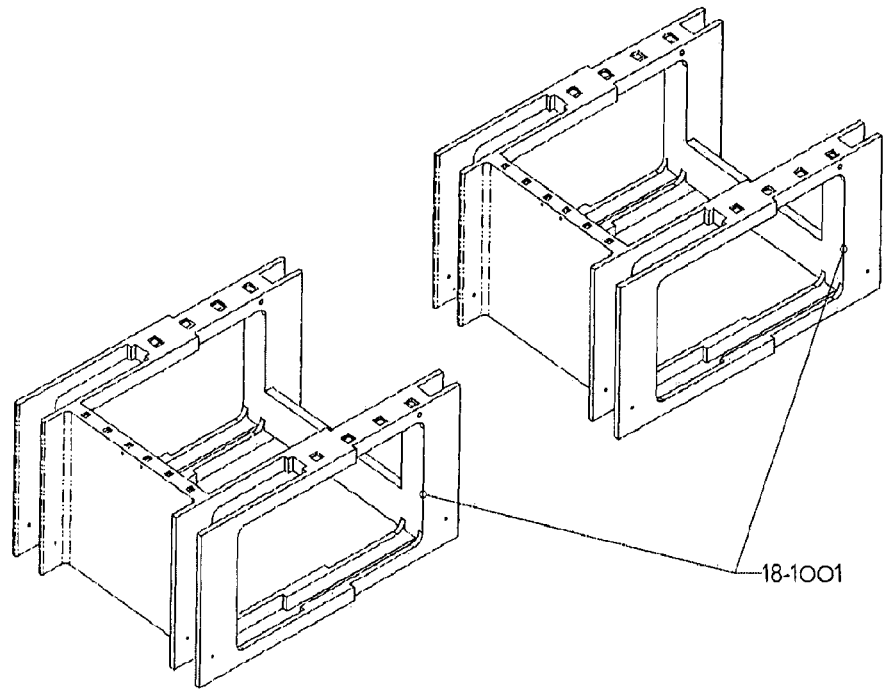
Figures 2, 3, 4, 5:
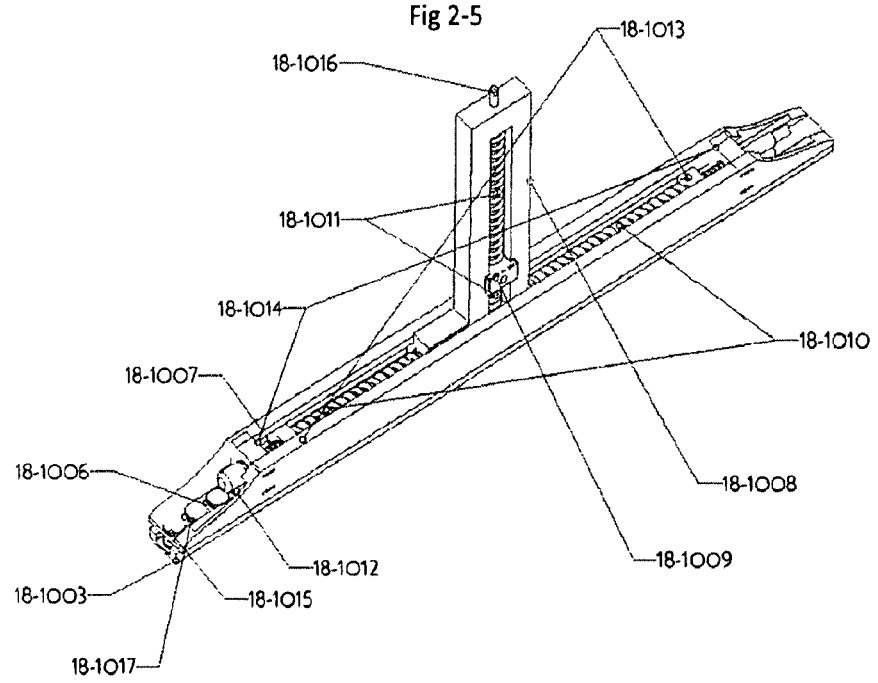
Figures 2, 3, 4, 5, 6:
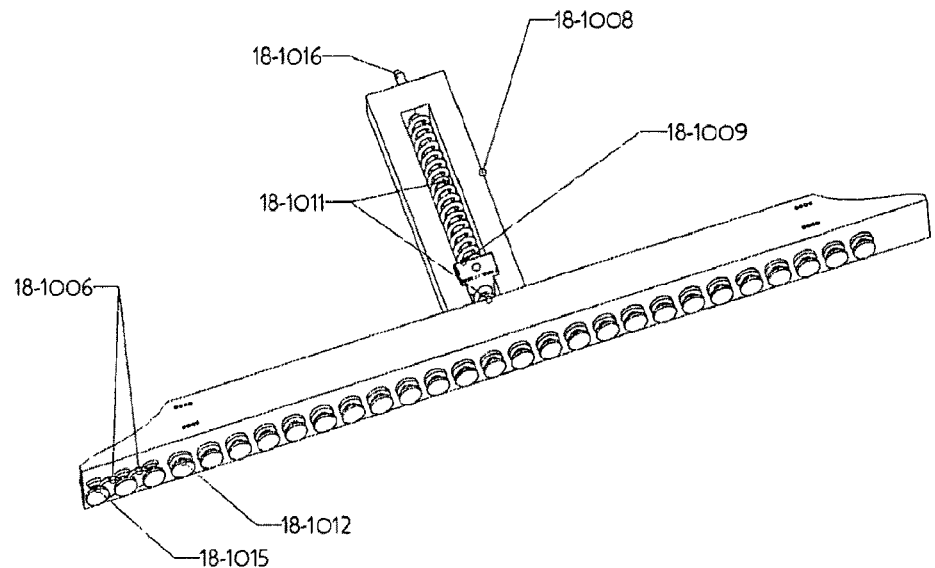
Figures 2, 3, 4, 5, 6, 7:
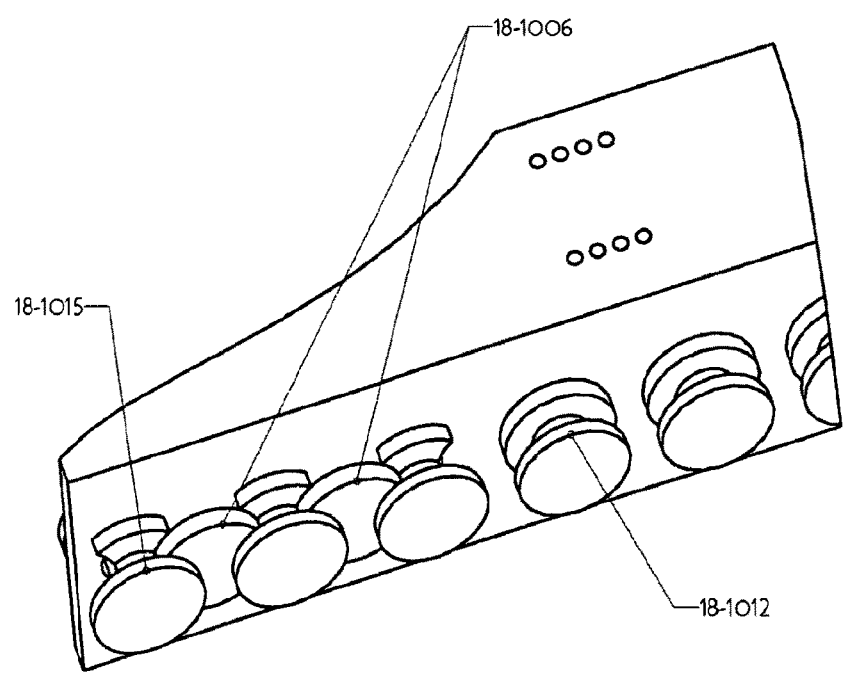
Figures 2, 3, 4, 5, 6, 7, 8:
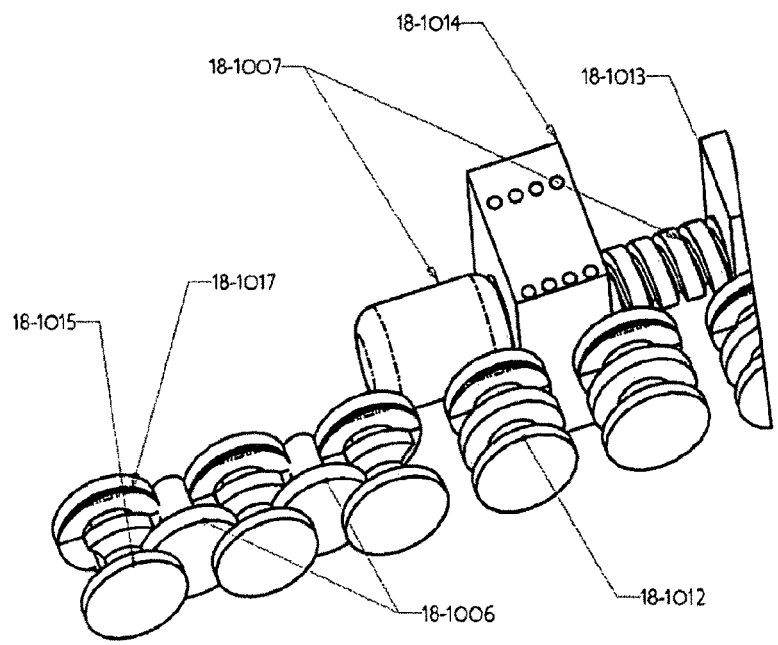
Figures 2, 3, 4, 5, 6, 7, 8, 9:
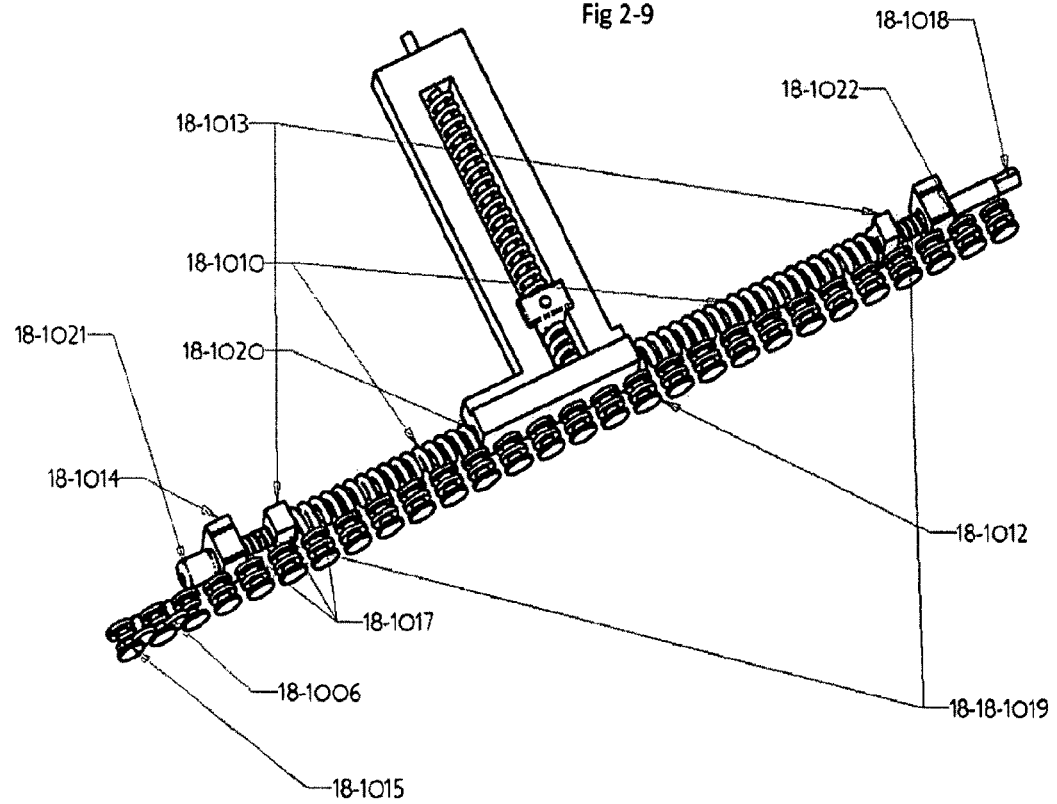
Figures 2, 3, 4, 5, 6, 7, 8, 9, 10:
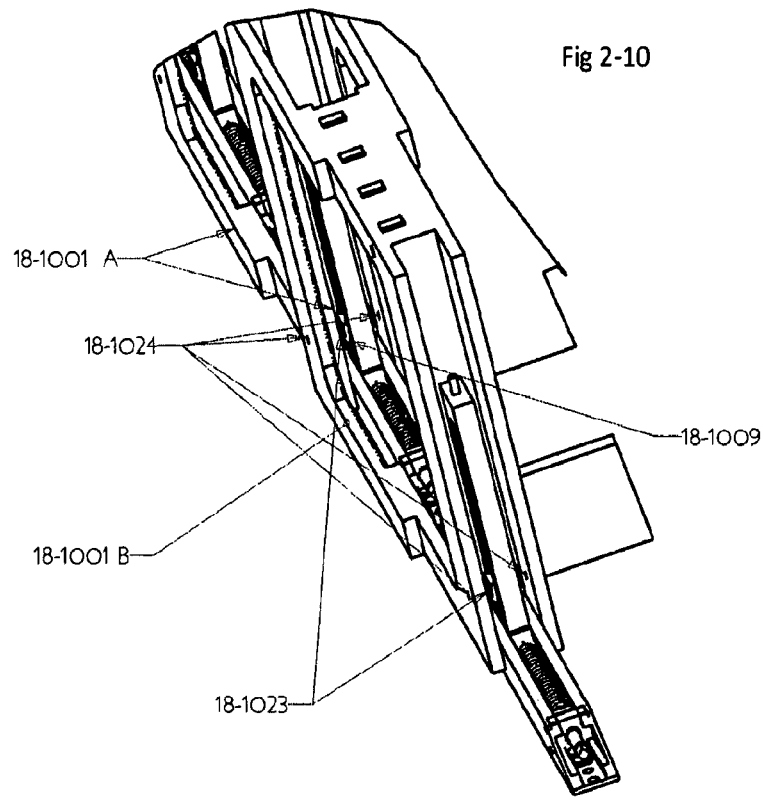
Figures 1, 3:
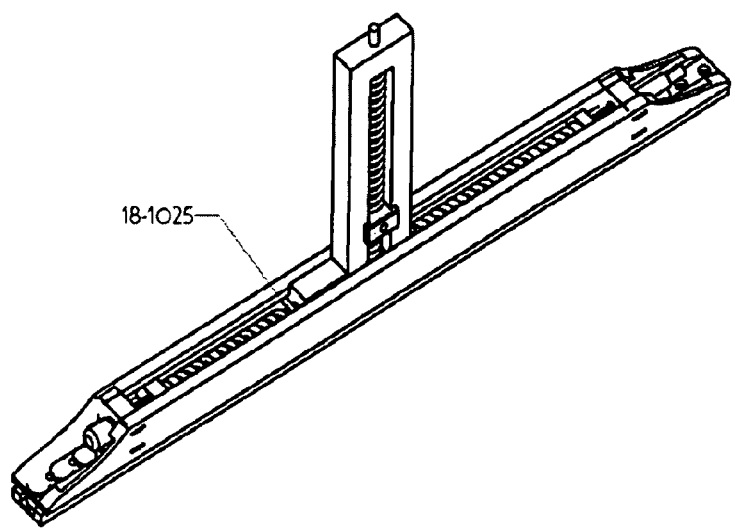
Figures 3, 4:
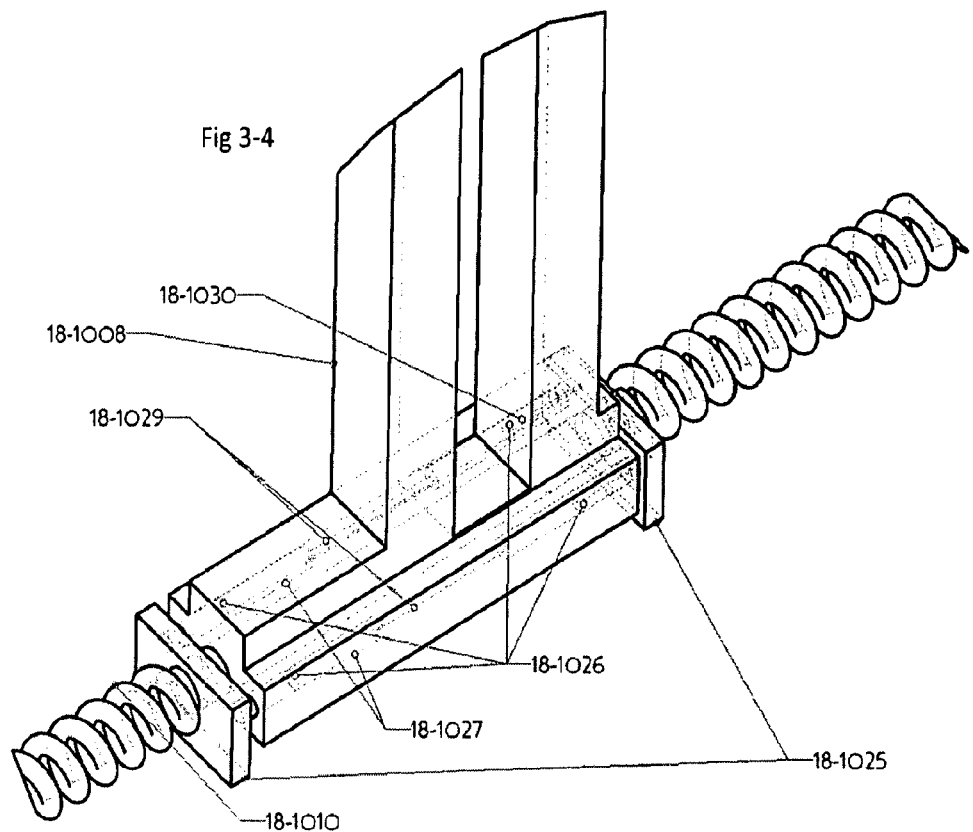
Figures 3, 4, 5:
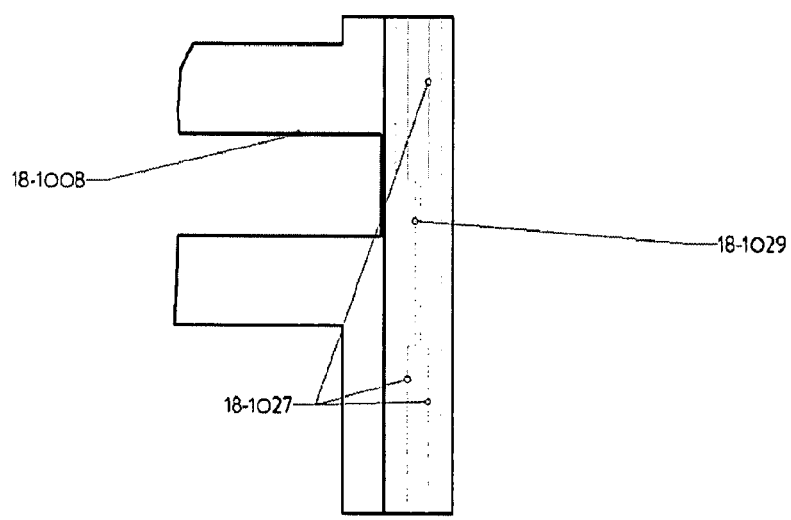
Figures 3, 4, 5, 6:
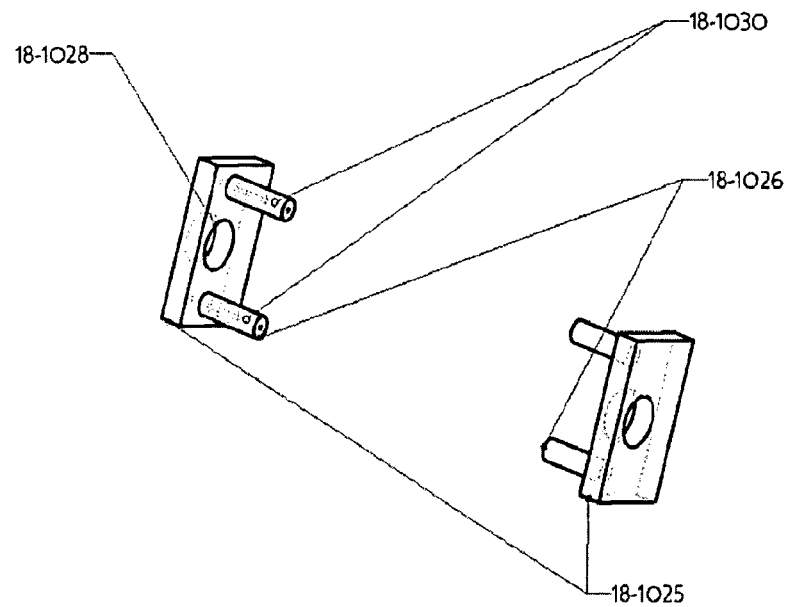
Figures 3, 4, 5, 6, 7:
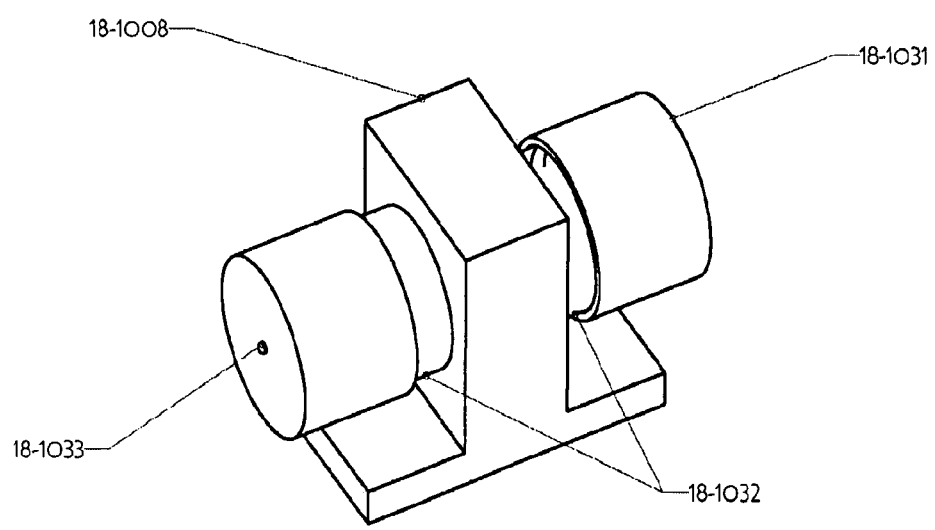
Figures 1, 4:
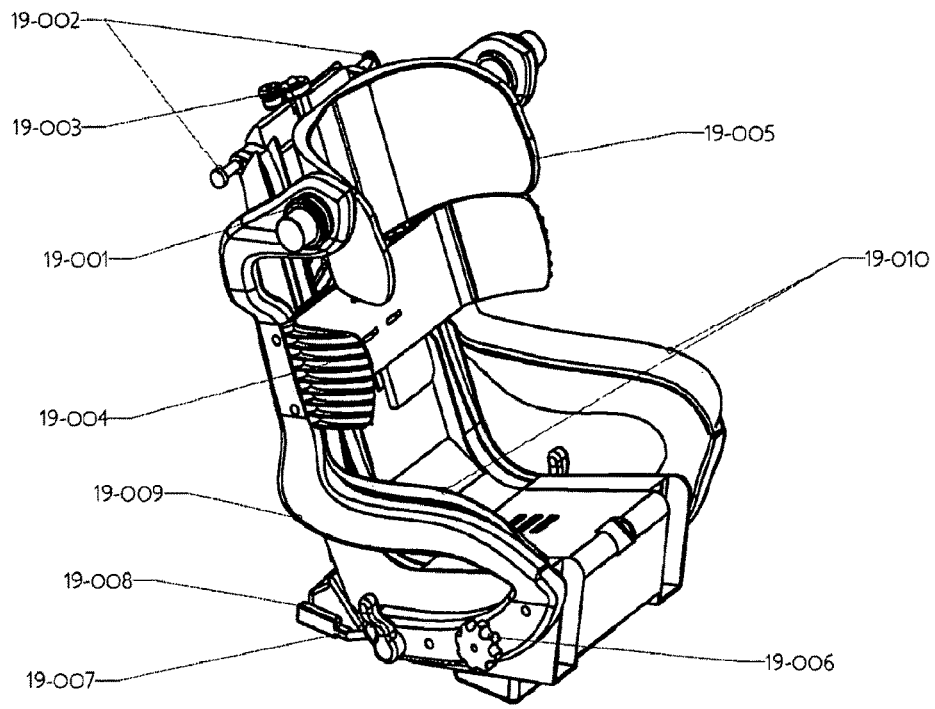
Figures 2, 4:
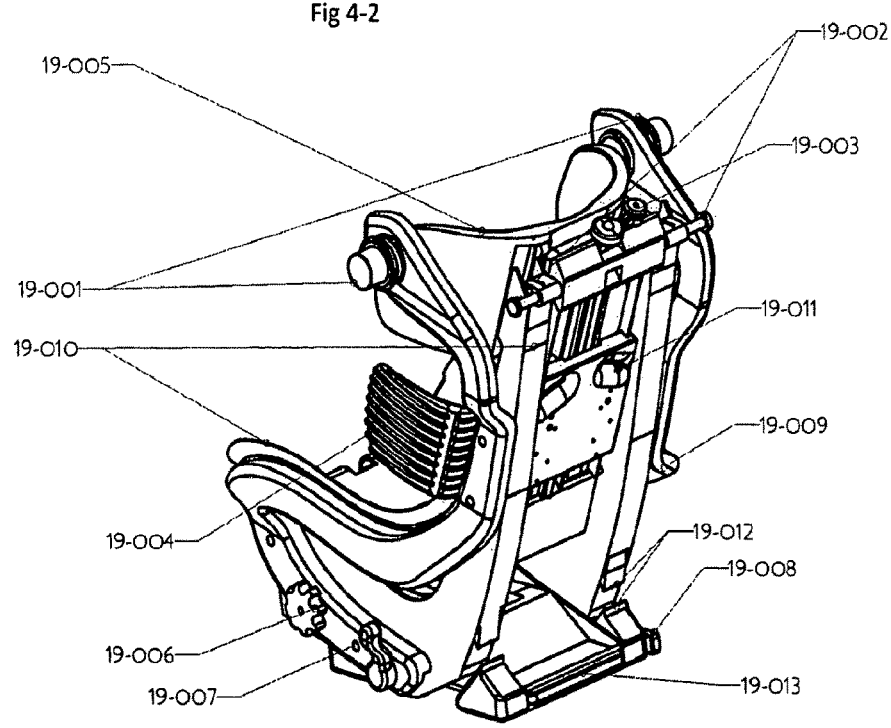
Figures 3, 4:
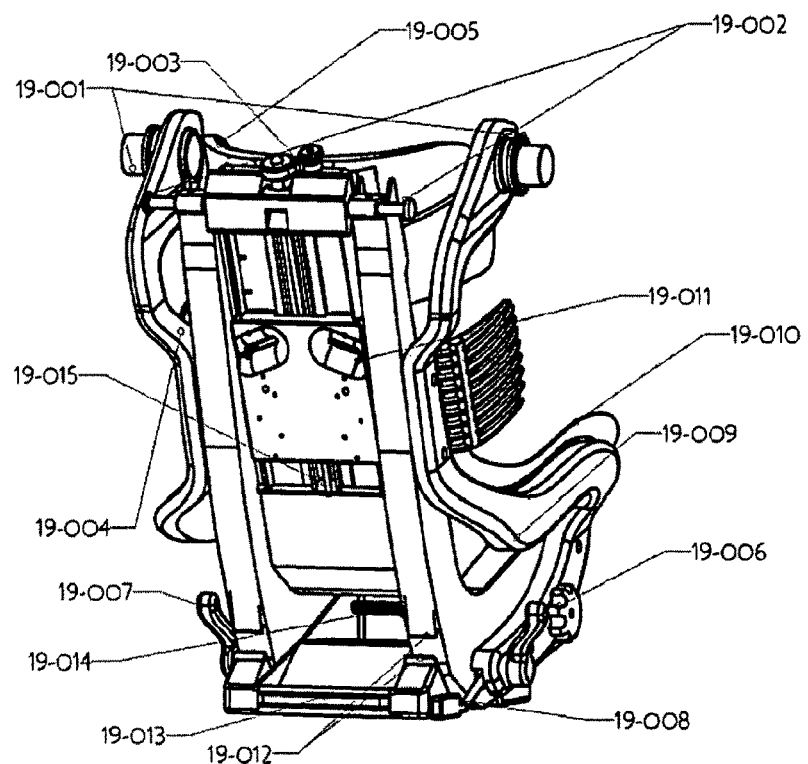
Figure 4:
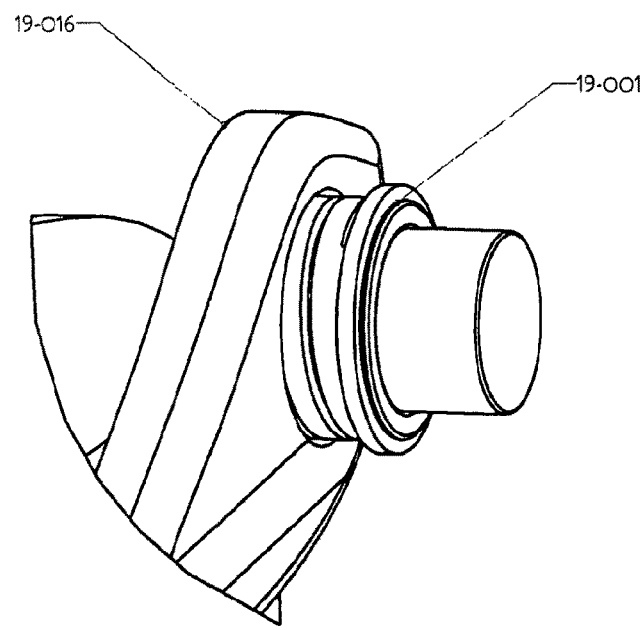
Figures 4, 5:
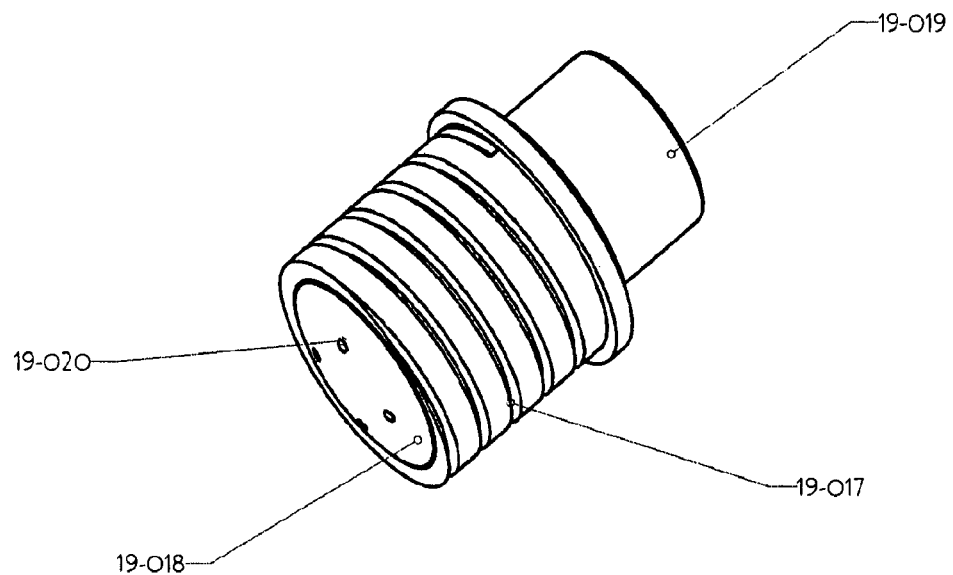
Figures 4, 5, 6:
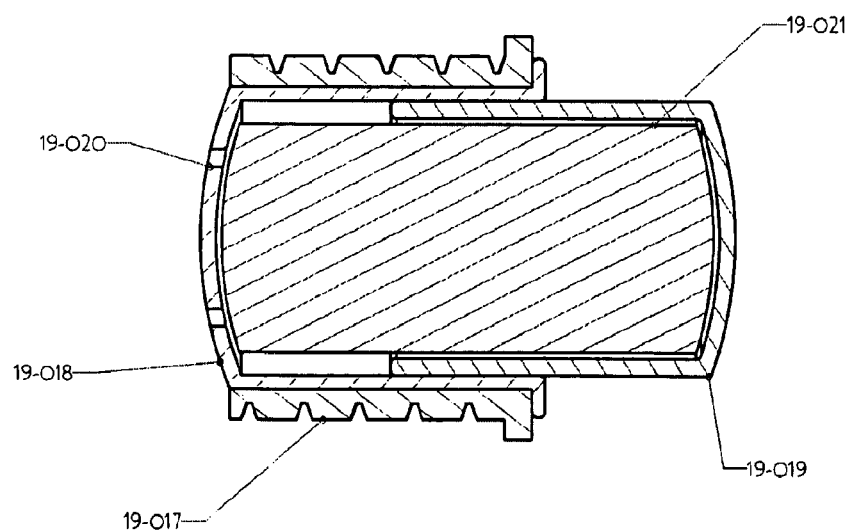
Figures 4, 5, 6, 7:
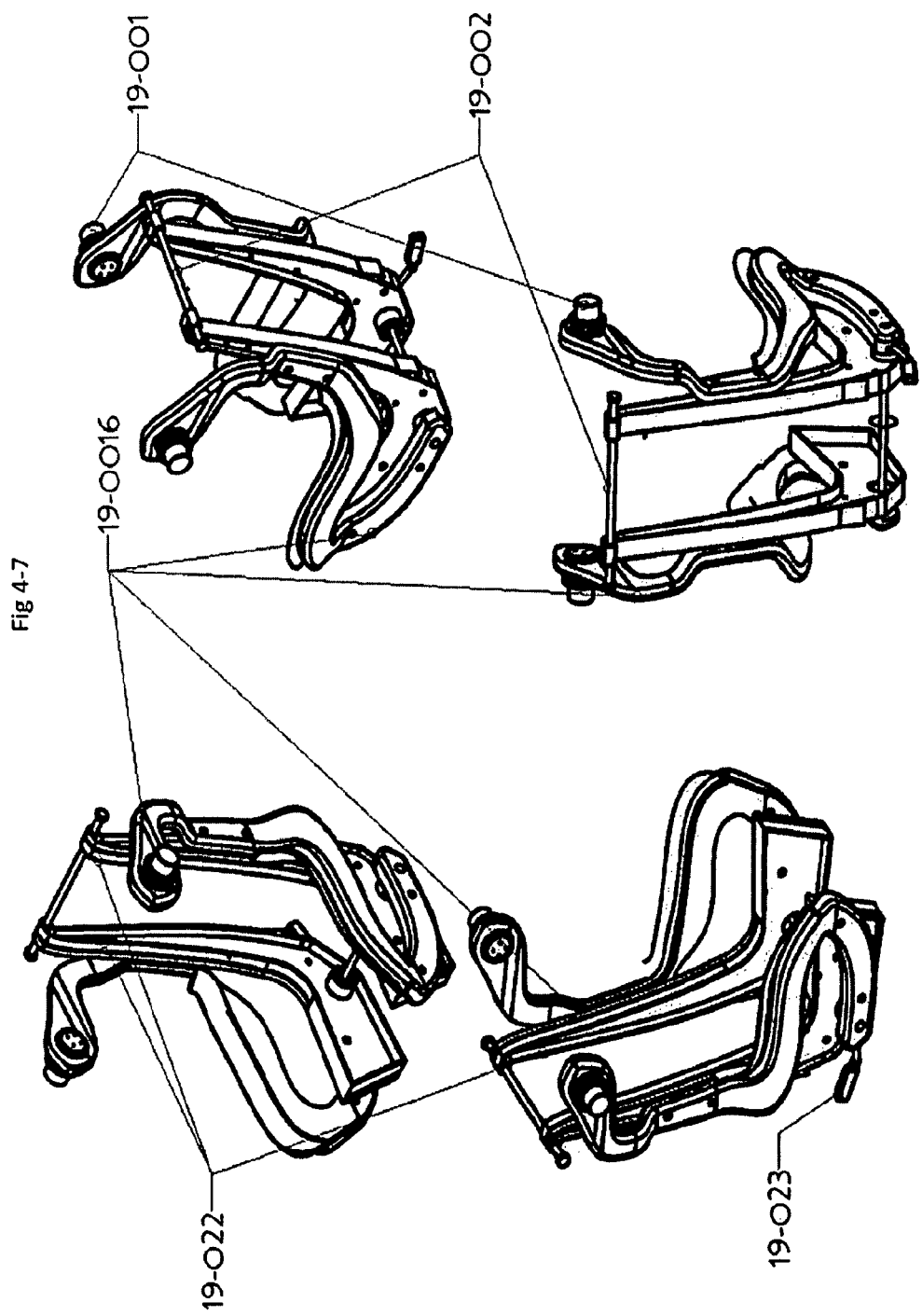
Figures 4, 5, 6, 7, 8:
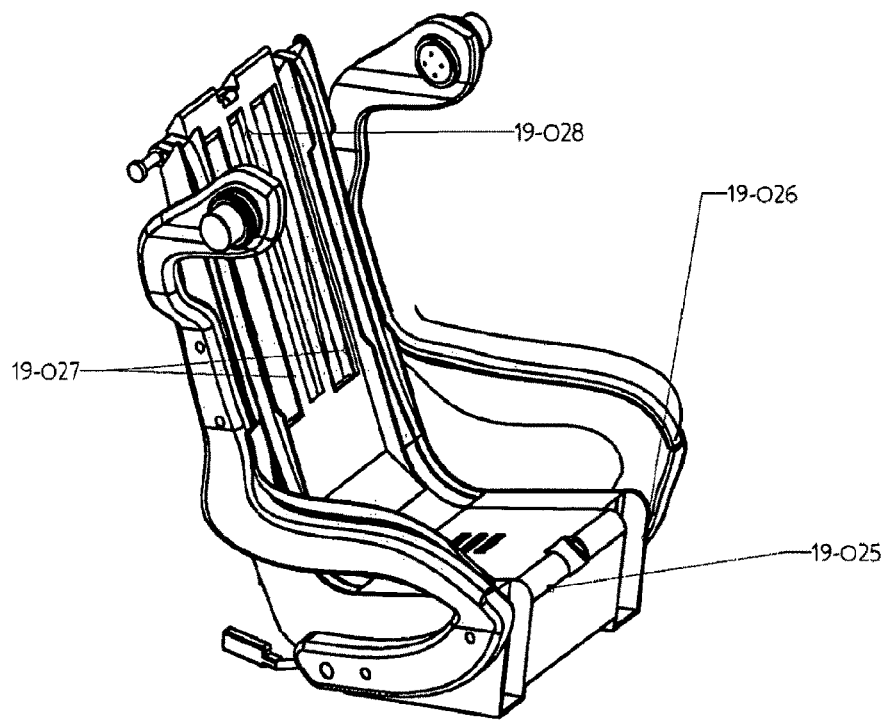
Figures 4, 5, 6, 7, 8, 9:
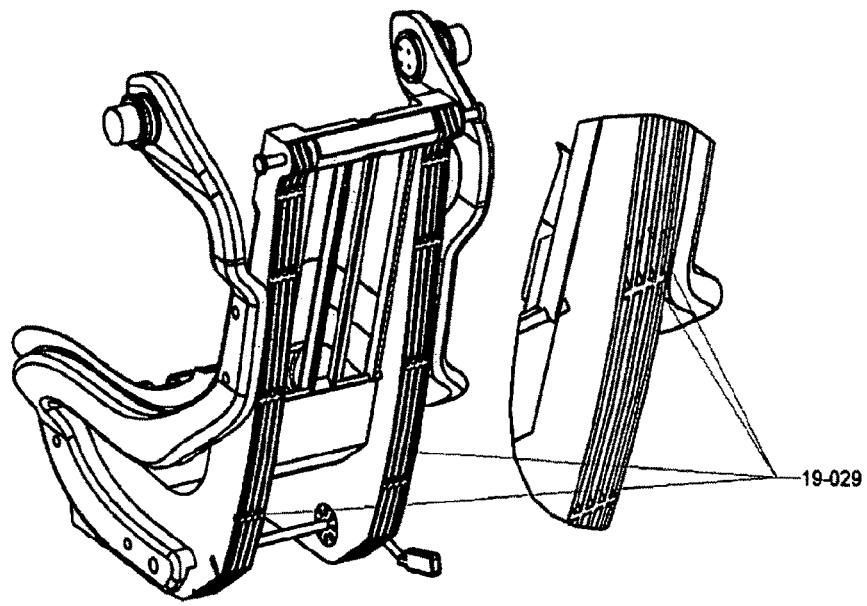
Figures 4, 5, 6, 7, 8, 9, 10:
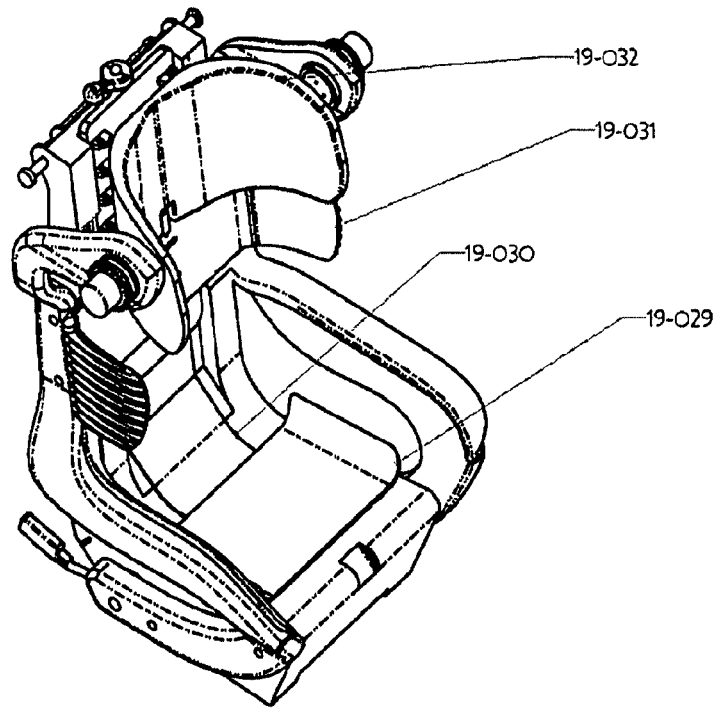
Figures 4, 5, 6, 7, 8, 9, 10, 11:
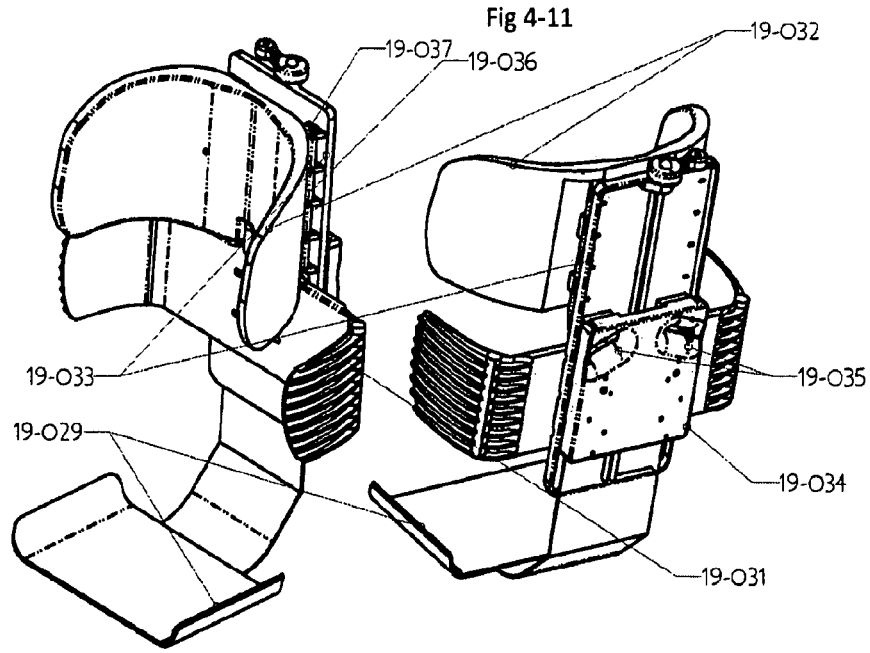
Figures 4, 5, 6, 7, 8, 9, 10, 11, 12:
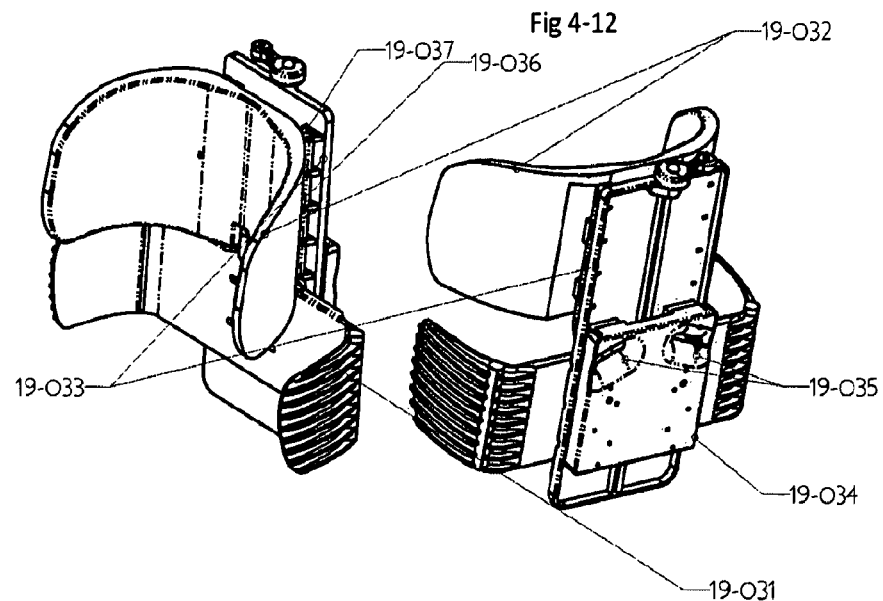
Figures 4, 5, 6, 7, 8, 9, 10, 11, 12, 13:
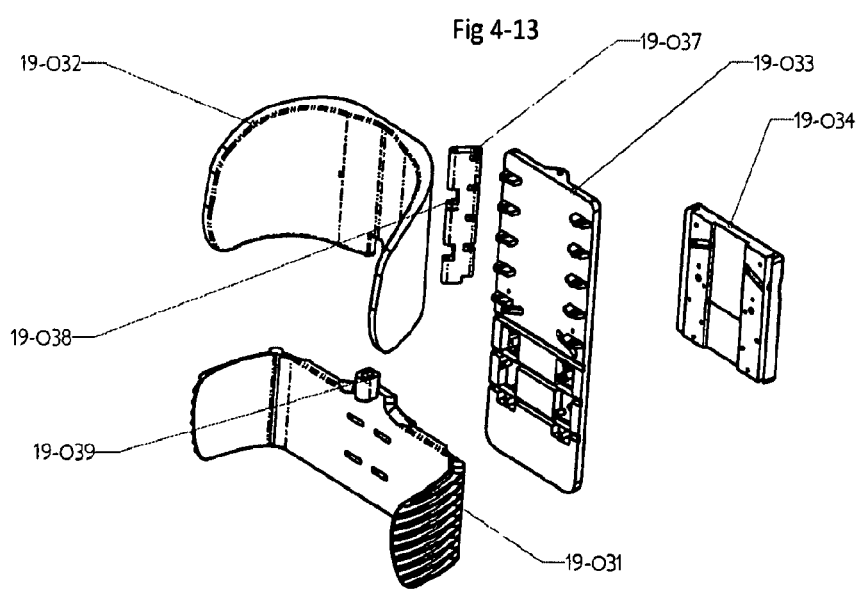
Figures 4, 5, 6, 7, 8, 9, 10, 11, 12, 13, 14:
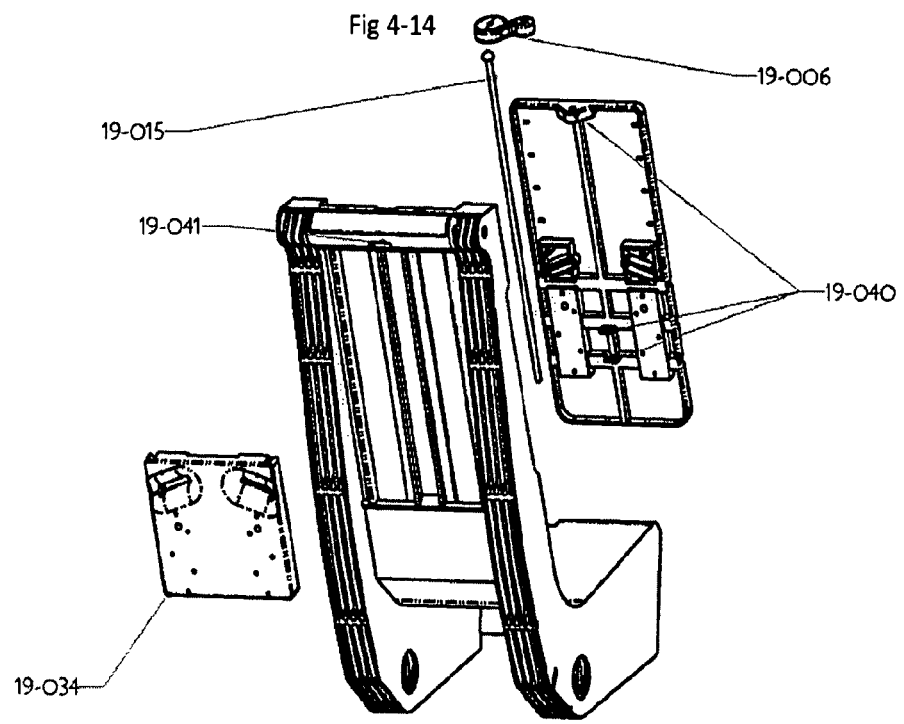
Figures 4, 5, 6, 7, 8, 9, 10, 11, 12, 13, 14, 15:
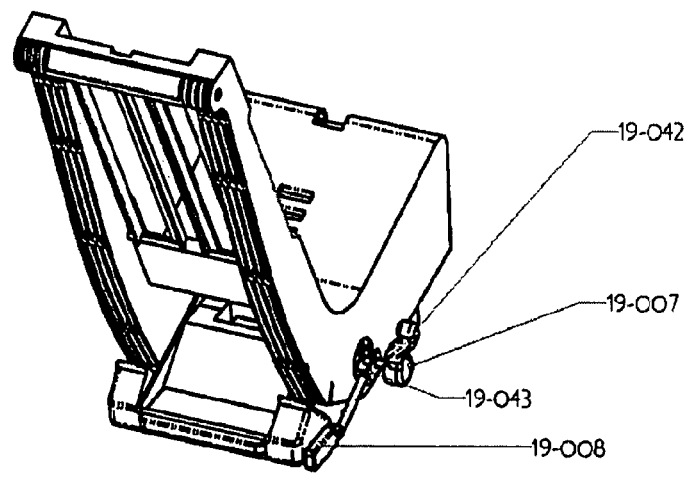
Figures 4, 5, 6, 7, 8, 9, 10, 11, 12, 13, 14, 15, 16:
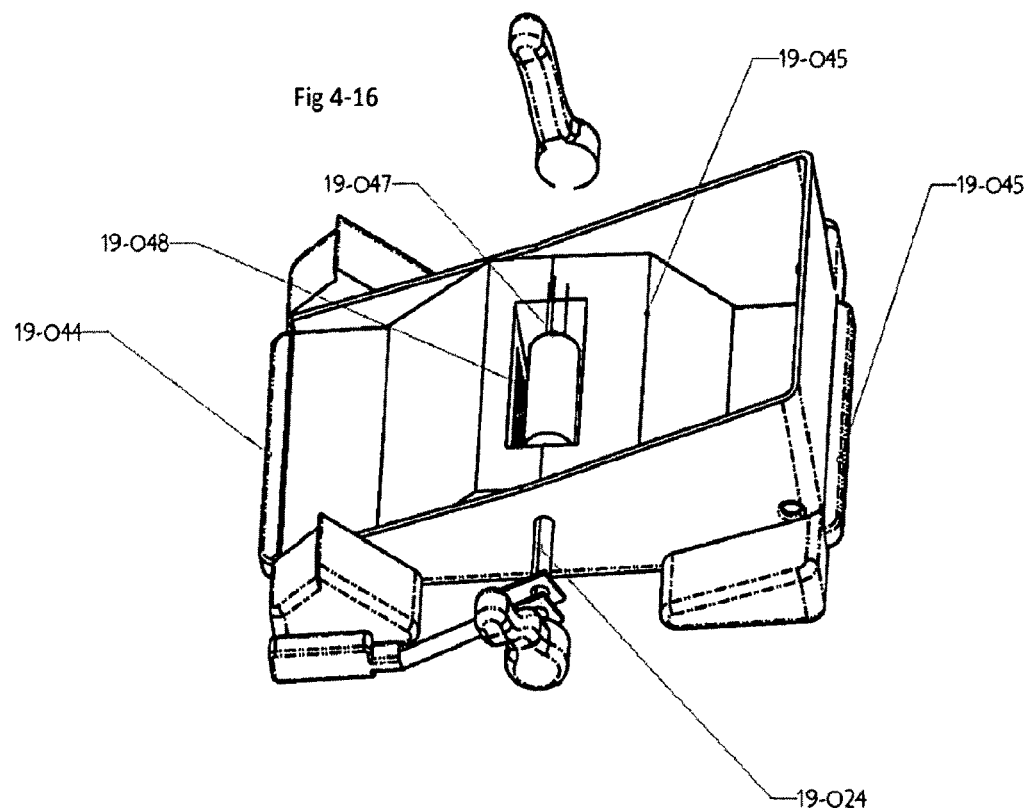
Figures 4, 5, 6, 7, 8, 9, 10, 11, 12, 13, 14, 15, 16, 17:
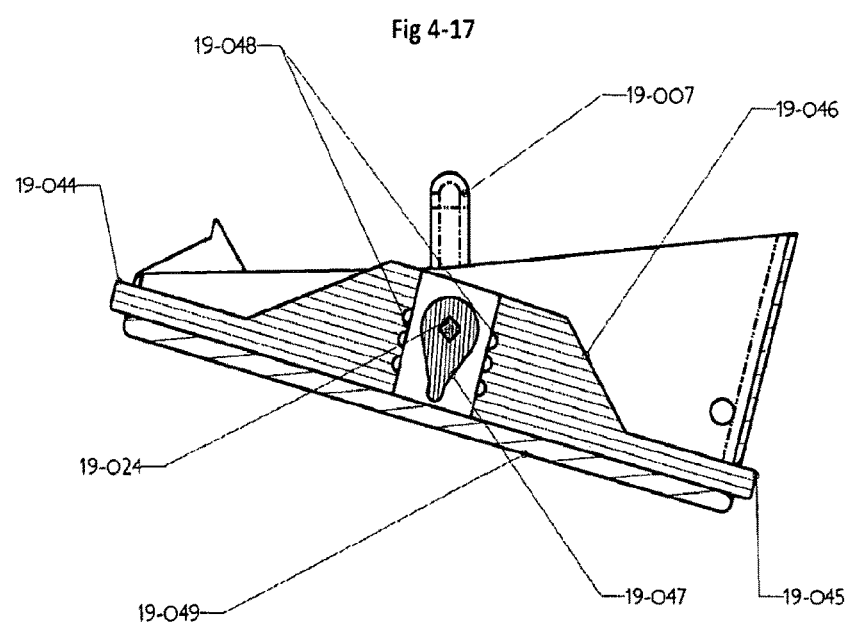
Figures 4, 5, 6, 7, 8, 9, 10, 11, 12, 13, 14, 15, 16, 17, 18:
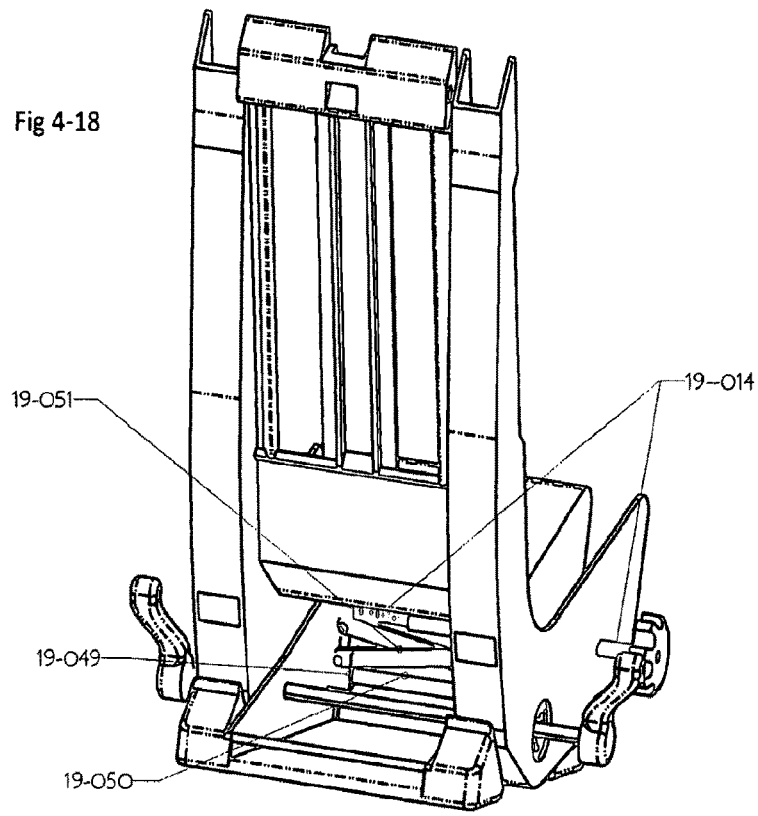
Figures 4, 5, 6, 7, 8, 9, 10, 11, 12, 13, 14, 15, 16, 17, 18, 19:
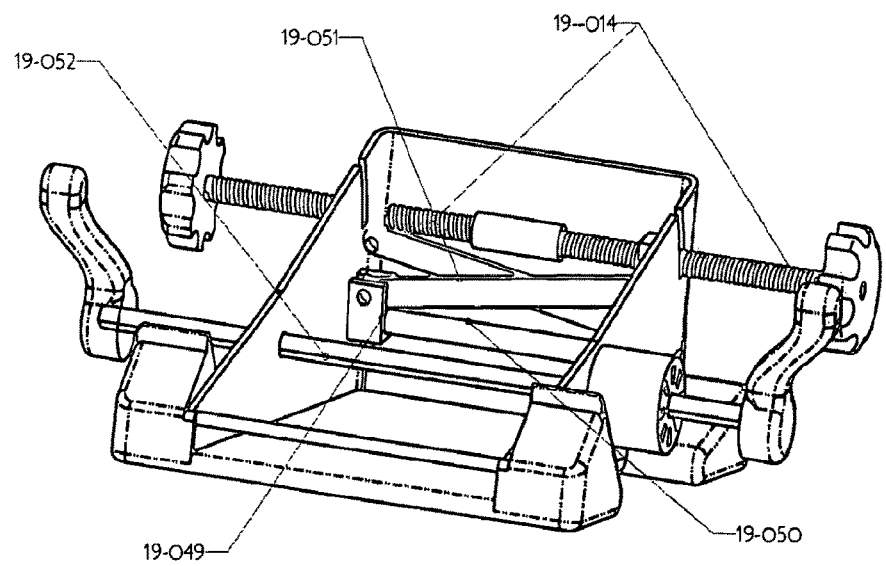

In all the architectures, hold rails may be installed. They are not shown in the interest of clarity. In the interests of safety a trap door for the stairs may be installed in some embodiments this is shown in FIG. 16. The Trap door may be operated by a lever mechanism or cable mechanism as well disclosed in the background art and attached to the guard rails 17-1028 for easy operation.

Egress Ingress for passengers away from the Aisle.

The units away from an aisle will not have steps as they cannot serve any purpose (eg FIG. 1-12) the is the case for high density embodiments and "window" units even with two adjoining AirSleeper units.

The "Foot-flip" arrangement on the leg rest of the upper Sleeper/seat unit accommodates this problem by allowing a passenger to bass by a sleeping passenger in a flat bed positioned sleeper, by simply flipping up the "foot-Flip" which may be about 4" wide and may simply move the sleeping passenger's fee by a few inches if anything.

The Foot flip may be designed to have an end stop that prevents it from flipping down as well. This will ensure it provides a firm sleeping surface when not flipped up.

Storage

Storage space below the lower seat and the lower foot rest should be adequate for carry on bags. Notably when there are multiple units installed laterally next to each other, the storage spaces will be aligned. Manual or powered belt arrangements (disclosed in a prior invention) can be installed to use the entire space for storage)

Installation

Installation is particularly convenient for narrow versions of this embodiment of the air sleeper. With 19 inch aisles, 18 inch wide as sleepers can easily be wheeled in and installed in each of the rows. Such a structure would also allow the replacement of individual units without removing units to the fore and aft of the subject unit.

Vehicle Child Support

Side Impact Isolation Technology

One of the features of the present invention is an open architecture.

There is no shell in the child seat in the present invention only a profile seat with back and bottom. However additional side structures may be added. This feature of the present invention is called "side impact isolation technology". The open architecture is composed of two subassemblies that isolate the side-impact loading to be transferred directly to the vehicle through the lateral brace frame, while the child is ensconced in a movable structure or system that uses the inertial loading on the human body to articulate the head rest to ensconce the head and also move the shoulders, and in some embodiments the lower torso in a controlled way within the space of the child seat.

The lateral brace frame comprises a lateral brace on each side of the child seat, which may in some embodiments carry an air cushion assembly. The lateral brace frame is attached to an I-beam structure that follows the back and the bottom of the child seat-forming a profile seat. The web of the I-beam are the back and the bottom of the child seat. The I-beam end sections are the items 19-022 that carry tensile and compressive loadings during a side impact. This I-beam structure is attached to the vehicle through two or more lateral rods. The first of these rods is the dual tether support rod 19-002 at the top of the I-beam section, and the second of the lateral rods is the pivot shaft 19-024 at the lower back of the child seat. This lower rod 19-024 is also attached to the base of the child seat in addition to the anchors 19-008 that firmly attach the rod to the vehicle. The dual tether support 19-002 is attached by two sections of tether laterally spaced at its ends thereby providing lateral stability in a side impact as well as support in front impacts.

The I-beam end members/flanges may be attached to the web of the I-beam (seat back and bottom) in a variety of ways well disclosed in the background art for such I-beam sections use in a number of industries. The embodiment shown illustrate two approaches where the flanges are inserted into cavities created at the ends of the web section material, and a second approach where the same material of the of the web section of the I-beam is widened to form the flanges of the I-beam. In addition this architecture with the I-beam structure for lateral load support may have in addition Flanges themselves forming I-beams or bracing for front impact load support. ie The Flanges of the (primary) I-Beam for lateral support as noted above, become the web and one or more flanges of a secondary I-beam in the forward direction of the seat for front impact loadings. Viewed another way the flanges of the primary of the I-beam, are themselves secondary I-beams for support in the forward direction, wherein the mid section of the primary flanges become the web of the secondary I-beam and these secondary I-beams also have their own secondary flanges for one or both of compressive and tensile loading in front impacts. The secondary I-beam may in addition have additional bracing within its structure for front impact loadings. As shown in the embodiments in the figures the web of the primary I-beam, is best offset from the front surface of the flanges to support lateral loads. FIGS. 4-7, 4-8, 4-9 illustrate the structure. FIG. 4-7 shows the flanges of the lateral or primary I-beam 19-022 with a cross supports 19-002 (the dual tether support) and the pivot shaft 19-024. These flanges also perform as secondary I-beams in themselves for rigidity with regard to front impacts. Therefore much of the section of these flanges perform as the web of the secondary I-beam, with their front and back edges used as flanges of the secondary I-beam. One such embodiment is shown in FIG. 4-7. FIG. 4-8 illustrates the seat back and bottom that create the profile seat in this invention that performs the function of the web of the primary or lateral I-beam.

The structure of the flanges of the primary I-beam can take many forms. In some embodiments the same material as the web of the primary I-beam forming the profile seat has cavities where the flanges may be inserted. In other embodiments as in FIG. 4-9, the same material of the web of the primary I-beam which forms the profile seat is shaped to form the flanges. These flanges are also structured to perform as secondary I-beams. In the embodiment shown in FIG. 4-9 secondary I-beam has a single flange in front.

However this may be supplemented by an attached flange at the rear (not shown).

The structural rigidity of the seat profile for lateral impact needs to work in conjunction with a load path to the vehicle. In the front facing position, considering that the central mass of the child is forward of the seat back there will be a rotational moment that will twist the seat bottom towards the impact. The architecture of the present invention includes a dual tether mount spaced apart and attached to the rigid frame to counteract this rotational movement. The tethers are mounted directly to the frame in the embodiment shown. At the lower end the rigid frame is attached to the anchors through the pivot shaft 19-024.

The second subassembly for implementing the side impact isolation technology, comprises a body guard which in most embodiments includes a shoulder guard and may in some embodiments include a dynamic seat pad, which are slidably attached laterally to the first subassembly with controlled resistance for such movement. Some embodiments of this second subassembly have a head rest that is attached to the remainder of the bodyguard and moves accordingly. In other enhanced embodiments of this second subassembly the headrest is an articulating headrest as shown in the figures, and uses the inertial loading on the remainder of the bodyguard, in particular in many embodiments the shoulder guard, to articulate and rotate the headrest to ensconce the head during a side impact.

The controlled resistance of the shoulder guard and the dynamic seat pad may in some embodiments be implemented with frictional attachments or load limiters, that do not activate under normal operations but allow movement only during impact conditions which results in large inertial loadings laterally.

The articulating headrest is attached to the front plane with two links these links are angled to the front plane 19-0-33, with a pivotal attachments such that the fronts of the links are closer to each other than the rear of the links that are attached to the front plane. The front of the links are each attached to a pivotal attachment on the headrest. This attachment means, enables the headrest to rotate and reorient as the center of the headrest is laterally moved. The movement of the center of the headrest is enabled by a vertical pin attached to an aperture on the headrest riding in a slot on the shoulder guard which can slide laterally under impact conditions.

Therefore during a lateral impact, the shoulder guard slides laterally pulling with it the slot on it thereby pulling the pin attached to the headrest laterally which in turn rotates and reorients the headrest to ensconce the head. In addition to the pin that engages the headrest to the shoulder guard, the shoulder guard may have a protrusion that engages a cavity on the headrest as shown in FIG. 4-10 at the center of the headrest.

In some embodiments where a dynamic seat pad is used, the seat pad itself is enabled to slide laterally when there is a substantially high lateral inertial loading on the seat pad, thereby providing an additional articulating force to move the headrest as previously described. The attachment means between the dynamic seat pad and the shoulder guard which is attached to the headrest assembly enabled to move up and down, needs to have a vertical sliding mechanism between the dynamic seat pad and the shoulder guard in the attachment to allow such motion of the headrest assembly in a vertical direction. One such embodiment would be a vertical slot on the extension of the dynamic seat pad that engages a pin on the shoulder guard. This will allow the headrest assembly with the shoulder guard to move up and down while the pin slides in the slot, while all the time being enabled to bear a lateral load transferred by the dynamic seat pad to the shoulder guard in the event of a lateral impact.

The shoulder guard in some embodiments is enabled to be adjusted for with, to ensure that the occupant is close to the side wings of the shoulder guard thereby protecting the shoulders and ensuring that the inertial loading of the shoulder reaches the shoulder guard very quickly during side-impact. Such adjustments are easily accomplished with separate parts for the wings of the side guard and the central section of the site guard attached together by means well disclosed in the background art. The harness path from the front of the seat to the rear of the seat is through the harness slots on the front and back pain a line to each other 19-035. Lateral AirCushion Technology.

In side impact, while in theory having the rigid frame attached to the vehicle would transfer much of the loading in side impact away from the occupant in a dynamic carriage, in practice there will be a displacement of the frame relative to the vehicle upon contact with the intruding object. To maximize the opportunity to lower the peak acceleration of the frame, it is best to have engagement of the seat frame with the vehicle side as soon as a impact condition is sensed. Moreover after such an impact condition is sensed the acceleration off the frame should be gradual rather than sudden to minimize peak acceleration's transferred to the seat. The latter lack cushion technology provides this function, to start compressing when impact conditions are sensed on the side of the vehicle, progressing such compression at a controlled rate to lower peak acceleration's. The air cushion is adjustably mounted to the lateral brace. Some embodiments use a screw thread on the brace engaging the screw thread on the outer surface of the air cushion. Some embodiments of the air cushion comprise a sleeve that has a screw thread that engages the lateral brace into which is inserted a parent cavity which may have vent holes, which has a child cavity inserted into it as a piston into a cylinder. Other embodiments may have multiple pairs of Pistons and cylinders telescoped into each other i.e. multiple cylindrical sections where for each the outer surface serves as a piston and the inner surface serves as a cylinder. The last cylindrical sections on both sides of the assembly will have a closed end on the outer end to create a closed cavity. During impact conditions the piston will move into the cylinder thereby compressing the air inside the cylinder which is allowed to vent in a controlled way through the vent ducts 19-020 or the space between the Pistons and cylinders. Some embodiments main addition have compressible material inside the aircushion, and others may have foam or other porous materials inside the cavity to moderate the compression rate of the air cushion under impact conditions. The action of the lateral lack cushion will increase the time that is available for the inertial loading of the child on the dynamic carriage to perform the desired protective movement.

Vertical Adjustment of Headrest Assembly

The headrest assembly which in many embodiments comprises the headrest, a support for the harness, and the shoulder guard. A vertical movement mechanism is required to relocate this assembly as the child grows. FIG. 4-14 shows an embodiment of this mechanism. The front frame 19-033, and the backplane 19-034, both have matching slots for the harness. The front plane and the backplane sandwich the seat back and a secured to each other with securing means such as rivets through the vertical slots on the seat back. Moreover, the front plane and backplane have protrusions that engage the slot on the seat back thereby ensuring that they slide vertically on the seat back moving with them the slot for the harness, the headrest, the shoulder guard. The movement of this assembly vertically in some embodiments is enabled by a threaded Rod 19-015 that is pivotally attached to one or more points on one or both of the front plane and the backplane these points are shown in 19-040. These pivotal points do not allow a vertical movement of the threaded Rod while it is rotated. The threaded Rod is also inserted into a knot in the center of the seat back 19-041. Therefore when the threaded Rod is rotated about its axis the nut will push up or down the threaded rod thereby raising or lowering the headrest assembly. Rotation of the threaded Rod about its axis is enabled with a handle on knob at the top end of the threaded Rod. This will always be at the top of the headrest assembly as it moves up and down. Considering that during front impact conditions there is a substantial loading on the harness pulling it forward, the back plane needs to brace itself against the seat back to transfer this load to the attachment points of the seat. This is enabled by the back plane riding in grooves as close as possible to the support structure on the sides of the seat.

Anchor Attachment

The anchor or ISOFIX attachment needs to serve the seat for both front facing and rare facing orientations. This is achieved in some embodiments of this invention by a direct attachment of the anchor assembly to the pivot shaft 19-024. The anchor head is attached to a rod or other attachment device which is pivotally attached to a fixture on the pivot rod. The fixture on the pivot rod in turn allows it to pivot about the axis of the pivot rod. Therefore there are 2 degrees of rotational freedom for the anchor head. Moreover the position of the pivot shaft 19-024, is such that it is equally distant from the front and the back of the seat base. Therefore the same anchor mechanism can be rotated about 2° of rotational freedom and attached either at the front or the back of the seat. What remains is a means to tighten the anchor attachment with regard to the seat base. This is achieved by sliding device as shown in FIGS. 4-16 and 4-17. The slide 19-046 slides on the seat base and has a front bumper 19-045, and rear bumper 19-044 protruding through apertures in the seat base. Sliding forward or backward of the slider 19-046 where retention the anchor in the rear facing or front facing position respectively. The mechanism driving the slider comprises a cam riding on the pivot shaft 19-024 that may be twisted with handles on knobs 19-007. The shaft 19-024 in this embodiment may need to have a noncircular cross-section to ensure that it is able to transfer the torque from the handle/knob 19-007 to the cam 19-047. In such embodiments it will be necessary to have bushes with an inner section meeting this cross-section to a circular cross-section of the apertures that require pivotal motion of the shaft.

FIGS. 4-17 shows a cross-section of this arrangement. As may be seen the cam may be rotated to engage the slots/notches 19-048. In a front facing position the rear slots/notches are engaged by the cam to push it as far as possible so that there is a firm engagement of the bumper 19-044 against the back of the vehicle seat. In the rare facing position the cam is enabled to engage the front notches/slots of 19-048, so that the bumper 19-045 is pushed forward to engage the vehicle seat and tighten the anchors as a result.

Angle of Seat

Considering that the angle of the seat is to be changed in the rare facing position, and in addition multiple recline positions may be desired in the rare facing position, there is a need for the seat to have a mechanism to incline the seat relative to the seat base. Some embodiments of this invention pivot the seat relative to the seat base about the pivot shaft 19-024, and adjust the position with the mechanism at the front of the seat base. This mechanism at the front of the seat base is shown in FIGS. 4-18 and 4-19. There is a dual threaded rod 19-014 with a left thread and the right thread on the two sides of the bar with handles or knobs 19-006 attached to their ends. The threaded Rod is inserted into the seat and rides in a slot on the seat base. FIG. 4-19 shows the embodiment without the seat for clarity the threaded Rod is seen riding in the slot. The pair of nuts 19-053 ride on the threaded rods, and as the knobs/handles are turned, considering the left-hand thread and the right-hand thread on the two sides of the threaded shaft, the two nuts will move either towards each other or away from each other. This motion is captured by the scissor arrangement of the cross arms 19-051 which a pivoted in the middle, and thereby forced together the sliders 19-049 towards each other on the slide 19-050. During this motion, the slide 19-050 is pushed away from the threaded rods 19-014 thereby pushing the seat base away from the seat, as the seat is attached to the threaded Rod. Notably there could be considerable forces on the threaded Rod and the slide during impact conditions. Therefore many embodiments will have a support arrangement for the threaded Rod and/or the slide at the center. Such a support can for example be arranged with an aperture on the rib structure designed into the seat base and the seat (not shown).

Considering that the mass of the child in the front facing position can be substantial and therefore the impact loadings on the front of the seat with regard to the seat base can be substantial the arrangement is designed to have the seat bottom sitting on the seat base in the front facing position. This also forms the end stop for the front facing position. In the rear facing position that is more flexibility as the masses a smaller, therefore the extreme recline position of the seat with regard to the seat base hasn't stopped which is enabled by matching slots/protrusion 19-012 between the seat base and the seat at the rare of the seat.

CONCLUSIONS, RAMIFICATIONS & SCOPE

It will become apparent that the present invention presented, provides a new paradigm for implementing key safety features comfort and convenience features for occupants in vehicles.

The invention claimed is:

1. A latch for securing a structure comprising a plurality of connected occupant support modules to support tracks at a floor of an aircraft having an axis of motion of flight, said latch adapted to moderate forces between said support tracks and said connected occupant support modules utilizing one or both of:
   (i) a plurality of load equalizers in contact with a plurality of studs (18-1012) and with a body of the latch (18-1005),
      each load equalizer comprising a spring (18-1017) placed between the stud and the latch body to equalize loads among the plurality of studs as the body of the latch distorts under loading,
      wherein the load equalizers are configured to compress during impact conditions on the latch; and
   (ii) first and second sliding arrangements configured to moderate loads between said support tracks and said connected occupant support modules,
   said first sliding arrangement is configured to support and moderate vertical loads between said support tracks and said connected occupant support modules, said first sliding arrangement comprising:
   a horizontal slider (18-1008) with a vertical structural member with surfaces configured to support first ends of one or more vertical load limiters, wherein second ends of said vertical load limiters are attached to a vertical slider (18-1009) adapted to connect to said occupant support modules to moderate vertical loads; and
   said second sliding arrangement is configured to moderate horizontal loads between said support tracks and said connected occupant supports, said second sliding arrangement comprising:
   support surfaces (18-1013) attached to said latch body (18-1005) and configured to support first ends of one or more horizontal load limiters, wherein second ends of said horizontal load limiters are configured to support said occupant support modules to moderate horizontal loads along the axis of motion of flight of the aircraft and between said support tracks and said occupant support modules.

2. The latch as in claim 1, wherein the plurality of studs are attached to the latch body, wherein said studs are enabled to slide into apertures on the support track and thereafter slide laterally into a retaining groove on the support tracks; and
   further comprising plunger pins adapted to be lowered into said apertures in the support tracks, thereby locking a portion of the latch along the support track.

3. The latch as in claim 1, wherein said second sliding arrangement further comprises a screw thread (18-1019) and nut (18-1013) arrangement to move the support surfaces relative to the latch body.

4. The latch as in claim 1, wherein said second sliding arrangement comprises a pair of said support surfaces and said one or more horizontal load limiters of the second sliding arrangement comprises a pair of said horizontal load limiters located between said pair of support surfaces with respective first ends adjoining, and wherein said horizontal slider is located between the second ends of the horizontal load limiters and slides on a horizontal guide on the latch body.

5. The latch as in claim 4, further comprising a mechanism for adjusting the horizontal position of the support surfaces relative to the latch body, the mechanism comprising a pair of nuts threaded on a horizontal threaded guide, wherein the pair of said nuts move in the same direction upon rotation of the threaded horizontal guide resulting in a motion of the horizontal load limiters along the threaded horizontal guide which in turn moves the second ends of said horizontal load limiters to a desired position, said rotation of the threaded horizontal guide actuated by a tool attached to one end of said threaded horizontal guide.

6. The latch as in claim 4, further comprising:
   a pair of piston plates (18-1025) with pistons therein engaging corresponding cylinders on opposing sides of the horizontal slider, wherein said horizontal slider comprises a vent hole (18-1029) between pairs of cylinders (18-1027) on either side of said horizontal slider, and wherein the pair of load limiters engage a surface of the pair of piston plates and therefore indirectly engage the horizontal sliders (18-1008), enabling a movement of the horizontal slider relative to the piston plates with the transfer of fluid between the piston cylinder pairs on either side of the horizontal slider to allow for a motion of the tracks and the latch body attached thereto, relative to the structure as a change in altitude of the aircraft results in pressure changes within the fuselage.

7. The latch as in claim 1, wherein the first sliding arrangement further comprises a guide rod (18-1016) supporting said one or more vertical load limiters.

8. The latch as in claim 1, wherein the second sliding arrangement further comprises a piston and cylinder arrangement with one of:
   i) a pair of pistons in a pair of cylinders attached back to back with a vent hole therebetween with the piston attached to the latch body and the cylinders attached to an attachment point of said structure; or
   ii) a pair of pistons in a pair of cylinders attached back to back with a vent hole therebetween with the piston attached to an attachment point of said structure and the cylinders, wherein the cylinders are attached to the latch body;

wherein cavities between the pistons and cylinders are filled with a fluid that can pass through the vent, and wherein a pressure differential between two piston cylinder cavities drives fluid through the vent limited by the viscosity and compressibility of the fluid, thereby providing a mechanism to move the attachment point of said structure relative to the latch body when there is a slow change in pressure gradient between the piston cylinder cavities, but resist movement of the support structure relative to the latch body when there is a rapid change in pressure gradient between the piston cylinder pairs as under impact conditions.

9. The latch as in claim 8, wherein the fluid is a compressible fluid, thereby offering load limiting characteristics for the piston cylinder pairs.

10. The latch as in claim 8, wherein the fluid is not substantially compressible.

11. The latch as in claim 1, wherein said structure comprises storage spaces adjoining the floor of the aircraft and adjoining the first sliding arrangement of the latch.

12. The latch of claim 1, wherein said plurality of occupant supports of said structure are arranged along the axis of motion of flight of the aircraft with attachments therebetween, and wherein pairs of said occupant supports with attachments therebetween in said structure are attached to the support tracks at the floor of the aircraft at common support points between said pairs of said occupant supports with said latch, and wherein said vertical load limiters of said latch are housed vertically above the support tracks in spaces between said pairs of said occupant supports in the structure.

13. The latch as in claim 12, wherein storage spaces located adjoining the floor of the aircraft in spaces between the vertical load limiters of the latches comprise drawers that nest within said storage spaces and are drawn out on slides attached to the structures.

* * * * *